United States Patent
Zhao et al.

(10) Patent No.: US 9,369,949 B2
(45) Date of Patent: Jun. 14, 2016

(54) METHODS AND APPARATUS FOR WIFI QUALITY ESTIMATION BASED ON BASIC SERVICE SET LOAD AND WIDE AREA NETWORK METRICS

(71) Applicant: QUALCOMM Incorporated, San Diego, CA (US)

(72) Inventors: Can Zhao, San Diego, CA (US); Kuo-Chun Lee, San Diego, CA (US); Sivaramakrishna Veerepalli, San Diego, CA (US); Arnaud Meylan, San Diego, CA (US); David William Craig, San Diego, CA (US); Tiruvaiyaru Kothandaraman Krishnaswamy, Saratoga, CA (US); Jay Kumar Sundararajan, San Diego, CA (US); Niranjan Ramesh Pendharkar, San Diego, CA (US); Gerardo Giaretta, San Diego, CA (US); Thomas Matthew Rebman, Boulder, CO (US); Vinod Nagarajan, Saratoga, CA (US); Sha Hua, San Diego, CA (US); Satashu Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 14/153,977

(22) Filed: Jan. 13, 2014

(65) Prior Publication Data
US 2015/0103812 A1    Apr. 16, 2015

Related U.S. Application Data

(60) Provisional application No. 61/890,861, filed on Oct. 14, 2013.

(51) Int. Cl.
*H04W 4/00* (2009.01)
*H04W 48/16* (2009.01)
(Continued)

(52) U.S. Cl.
CPC .............. *H04W 48/16* (2013.01); *H04W 48/18* (2013.01); *H04W 48/06* (2013.01)

(58) Field of Classification Search
None
See application file for complete search history.

(56) References Cited

U.S. PATENT DOCUMENTS

2004/0039817 A1* 2/2004 Lee et al. ....................... 709/225
2006/0223574 A1* 10/2006 Chandra .................... 455/552.1
(Continued)

FOREIGN PATENT DOCUMENTS

WO    WO-2013037328 A1    3/2013

OTHER PUBLICATIONS

ISA/EPO, International Search Report and Written Opinion of the International Searching Authority, Int'l App. No. PCT/US2014/059348, Apr. 9, 2015, European Patent Office, Rijswijk, NL, 21 pgs.
(Continued)

*Primary Examiner* — Afshawn Towfighi
(74) *Attorney, Agent, or Firm* — Holland & Hart LLP

(57) ABSTRACT

Methods, systems, and devices are described for determining a quality estimation of a wireless network that may be used to determine whether a particular wireless network meets one or more criteria for association with a station. The quality estimation may be based on a load quality of a basic service set (BSS) of an available wireless network and/or one or more wide area network (WAN) metrics associated with the wireless network. A station may evaluate such load quality and WAN metrics prior to association, and/or after association with a wireless network.

26 Claims, 20 Drawing Sheets

(51) Int. Cl.
*H04W 48/18* (2009.01)
*H04W 48/06* (2009.01)

(56) References Cited

U.S. PATENT DOCUMENTS

| | | | |
|---|---|---|---|
| 2007/0076811 A1* | 4/2007 | Aldana et al. | 375/267 |
| 2007/0091851 A1 | 4/2007 | Simonsson et al. | |
| 2008/0102852 A1* | 5/2008 | Du et al. | 455/453 |
| 2013/0012260 A1 | 1/2013 | Salkintzis et al. | |
| 2013/0097710 A1* | 4/2013 | Basavapatna | H04W 4/02 726/25 |
| 2013/0223423 A1 | 8/2013 | Lee et al. | |
| 2013/0242965 A1 | 9/2013 | Horn et al. | |
| 2013/0288673 A1 | 10/2013 | Le et al. | |

OTHER PUBLICATIONS

3GPP, "3rd Generation Partnership Project; Technical Specification Group Services and System Aspects; Study on WLAN Network Selection for 3GPP Terminals (Stage 2) (Release 12)," 3GPP TR 23.865 v12.0.0 (Sep. 2013) Technical Report, Sep. 11, 2013, pp. 1-45, 3GPP Organizational Partners.

AT&T et al., "WLAN-NS Key Issue #4—Solution," SA WG2 Temporary Document, SA WG2 Meeting #96, Apr. 8-12, 2013, San Diego, U.S.A., S2-130941, pp. 1-3, URL: http://www.3gpp.org/ftp/tsg_sa/WG2_Arch/TSGS2_96_San_Diego/docs/, 3rd Generation Partnership Project.

Blackberry UK Ltd., "Convergence of RAN2 and SA2 Work on Cellular-WLAN Interworking," 3GPP SA WG2 Meeting #99, Sep. 23-27, 2013, Xiamen, China, S2-133380, 6 pgs., URL: http://www.3gpp.org/ftp/tsg_sa/WG2_Arch/TSGS2_99_Xiamen/docs/, 3rd Generation Partnership Project.

ISA/EPO, Partial International Search Report of the International Searching Authority, Int'l App. No. PCT/US2014/059348, Feb. 11, 2015, European Patent Office, Rijswijk, NL, 6 pgs.

IPEA/EPO, Second Written Opinion of the International Preliminary Examining Authority, Int'l App. No. PCT/US2014/059348, Sep. 23, 2015, European Patent Office, Munich, DE, 12 pgs.

* cited by examiner

METHODS AND APPARATUS FOR WIFI QUALITY ESTIMATION BASED ON BASIC SERVICE SET LOAD AND WIDE AREA NETWORK METRICS

CROSS REFERENCES

The present application for patent claims priority to U.S. Provisional Patent Application No. 61/890,861 by Zhao et al., entitled "Enhance WQE With BSS Load and WAN Metrics," filed Oct. 14, 2013, assigned to the assignee hereof, and expressly incorporated by reference herein.

BACKGROUND

The following relates generally to wireless communication, and more specifically to determining a quality estimation of a wireless network. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communications system may include, for example, a number of access points, each simultaneously supporting communication for multiple devices. Access points may communicate with devices on downstream and upstream links. Each access point has a coverage range, which may be referred to as the coverage area of the access point. In WLANs, a basic service set (BSS) may provide a building-block of a WLAN. A simple BSS may include a single access point together with one or more associated device often referred to as a station (STA), access device, mobile device, or user equipment (UE), for example. The access point may act as a master to control the stations within that BSS.

Various stations (e.g., cellular phone, laptop computer, tablet computer, desktop computer, etc.) of a wireless network may have the capability to access two or more different networks. For example, a station may have access to different WLANs through different access points, and/or may have access to one or more wireless wide area networks (WWANs) through a cellular data service provider. A station having access to multiple WLANs/WWANs may desire to connect to a network that provides a relatively fast data service at a desirable cost.

SUMMARY

The described features generally relate to one or more improved systems, methods, and/or apparatuses for determining a quality estimation of a wireless network, such as a WLAN. Such a quality estimation may be used to determine, for example, whether a particular wireless network meets one or more criteria for association with a station. The quality estimation may be based on, for example, a load quality of a basic service set (BSS) of an available wireless network and/or one or more wide area network (WAN) metrics associated with the wireless network. The quality estimation may be based on a combination of one or more load quality parameters and/or one or more WAN metrics. A station may evaluate such load quality and WAN metrics prior to association, and/or after association with a wireless network. In examples in which the quality estimation is performed prior to association with a wireless network, a station may store an indicator for the wireless network when it is determined that the load quality of the BSS, the one or more WAN metrics associated with the wireless network, or a combination thereof, satisfy a threshold. In examples in which the quality estimation is performed after association with a wireless network, a station may periodically perform a quality estimation and maintain the association with the wireless network when it is determined that the load quality of the BSS, the one or more WAN metrics associated with the wireless network, or a combination thereof satisfy a threshold.

According to some aspects of the disclosure, a method for determining a quality estimation of a wireless network may include determining a load quality of a basic service set (BSS) of an available wireless network; determining one or more wide area network (WAN) metrics associated with the wireless network; and storing an indicator for the wireless network when it is determined that one or more of the load quality of the BSS or the one or more WAN metrics associated with the wireless network satisfy a threshold, the indicator being stored for future use in determining whether the wireless network is acceptable for association. In some examples, the method may also include blacklisting the wireless network when it is determined that either the load quality of the BSS or the one or more WAN metrics associated with the wireless network fail to satisfy the threshold.

In certain examples, storing the indicator for the wireless network may include determining that a combination of the load quality of the BSS and the one or more WAN metrics satisfy the threshold; and storing the indicator for the wireless network when it is determined that the combination satisfies the threshold. Determining the load quality of the BSS may include, in some examples, identifying a number of devices associated with the BSS of the wireless network; determining a channel utilization of the wireless network, the channel utilization based at least in part on the identified number of devices, and determining an available channel capacity of the wireless network, the available channel capacity based at least in part on a combination of the identified number of devices associated with the BSS and the determined channel utilization of the wireless network. Identifying the number of devices associated with the BSS of the wireless network may include, for example, receiving one or more beacon frames comprising a number of devices currently associated with the BSS, which may be represented in the one or more beacon frames as a ratio of a number of active devices to a total number of devices associated with the BSS.

In some examples, the method may also include performing an initial link status check (LSC) for the wireless network. Performing the initial LSC may include, for example, blacklisting the wireless network when a link status is determined to be down and a trust value associated with this determination satisfies a second threshold; and classifying the wireless network as acceptable when a link status is determined to be up and a trust value associated with this determination satisfies the second threshold. In other examples, a periodic LSC may be disabled when a trust value associated with a determined link status fails to satisfy the second threshold.

In some examples, the method may also include performing an initial backhaul capacity check (BCC) for the wireless network. Performing the initial BCC may include, for example, disabling a periodic BCC when a trust value associated with a determined link speed of the wireless network fails to satisfy a third threshold or a trust value associated with a determined link load of the wireless network fails to satisfy a fourth threshold. In other examples, performing the initial BCC may include classifying the wireless network as acceptable when a combination of a link speed and a link load of the wireless network satisfies a BCC threshold.

In other aspects of the disclosure an apparatus for determining a quality estimation of a wireless network may include means for determining a load quality of a BSS of an available wireless network; means for determining one or more WAN metrics associated with the wireless network; and means for storing an indicator for the wireless network when it is determined that one or more of the load quality of the BSS or the one or more WAN metrics associated with the wireless network satisfy a threshold, the indicator being stored for future use in determining whether the wireless network is acceptable for association. The apparatus may also include, in some examples, means for blacklisting the wireless network when it is determined that either the load quality of the BSS or the one or more WAN metrics associated with the wireless network fail to satisfy the threshold.

In certain examples, the load quality of the BSS and the one or more WAN metrics may be determined prior to association with the wireless network. In some examples, the means for storing the indicator for the wireless network may determine that a combination of the load quality of the BSS and the one or more WAN metrics satisfy the threshold, and store the indicator for the wireless network when it is determined that the combination satisfies the threshold.

In further aspects of the disclosure, a device for determining a quality estimation of a wireless network may include a processor and a memory in electronic communication with the processor. The memory may embody instructions executable by the processor to: determine a load quality of a BSS of an available wireless network; determine one or more WAN metrics associated with the wireless network; and store an indicator for the wireless network when it is determined that one or more of the load quality of the BSS or the one or more WAN metrics associated with the wireless network satisfy a threshold, the indicator being stored for future use in determining whether the wireless network is acceptable for association. In some examples, the instructions are may be further executable by the processor to blacklist the wireless network when it is determined that either the load quality of the BSS or the one or more WAN metrics associated with the wireless network fail to satisfy the threshold.

In certain examples, the load quality of the BSS and the one or more WAN metrics may be determined prior to association with the wireless network. In other examples, the instructions may be further executable by the processor to determine that a combination of the load quality of the BSS and the one or more WAN metrics satisfy the threshold, and store the indicator for the wireless network when it is determined that the combination satisfies the threshold.

In still other aspects of the disclosure, a method for determining a quality estimation of a wireless network may include associating with a wireless network; periodically determining a load quality of a BSS of an available wireless network; periodically determining one or more WAN metrics associated with the wireless network; and maintaining the association with the wireless network when it is determined that a combination of the load quality of the BSS and the one or more WAN metrics satisfy a threshold. The method may, in some examples, also include discontinuing use of the wireless network when it is determined that the combination of the load quality of the BSS and the one or more WAN metrics associated with the wireless network fail to satisfy the threshold.

In some examples, the method may also include accessing a previously stored indicator of the wireless network, the indicator indicating the wireless network is an acceptable wireless network. Additionally or alternatively, the method may include one or more of: determining a channel utilization of the associated wireless network; initializing a timer when it is determined that the channel utilization satisfies a channel utilization threshold; terminating the timer when it is determined that the channel utilization fails to satisfy the channel utilization threshold; or classifying a BSS load quality (BLQ) of the associated wireless network as unacceptable when the channel utilization satisfies the channel utilization threshold and the timer has expired.

In certain examples, the method may also include performing a periodic LSC for the associated wireless network. Performing the periodic LSC may include, for example, blacklisting the associated wireless network when a link status of the wireless network is determined to be down; and classifying the associated wireless network as acceptable when the link status of the wireless network is determined to be up. In other examples, the method may also include performing a periodic BCC for the associated wireless network. Performing the periodic BCC may include, for example, classifying the wireless network as acceptable when a combination of a link speed and a link load of the wireless network satisfies a BCC threshold.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to determining a quality estimation of a wireless network. Such a quality estimation may be used to determine, for example, whether a particular network meets one or more criteria for association with a station. According to some examples, the quality estimation may be based on a load quality of a basic service set (BSS) of an available wireless network and/or one or more wide area network (WAN) metrics associated with the wireless network. Such a wireless network may include, for example, a wireless local area network (WLAN). While various aspects of the present disclosure are described with respect to a WLAN, it will be readily understood that the disclosure applies to other types of wireless networks, such as a cellular network, for example.

In some examples, the quality estimation may be based on a combination of one or more load quality parameters and/or one or more WAN metrics. A station may evaluate such load quality and WAN metrics prior to association, and/or after association with a wireless network. Load quality may reflect, for example, utilization of the network resource in the dimensions of time, frequency, channelization code, or other dimensions associated with the particular type of multiple access system. WAN metrics may provide, for example, information about the backhaul quality of a wireless access node. In examples in which the quality estimation is performed prior to association with a wireless network, a station may store an indicator for the network when it is determined that the load quality of the BSS and the one or more WAN metrics associated with the wireless network satisfy a threshold. In examples in which the quality estimation is performed after association with a wireless network, a station may periodically perform a quality estimation and maintain the association with the wireless network when it is determined that the load quality of the BSS and the one or more WAN metrics associated with the wireless network satisfy a threshold.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
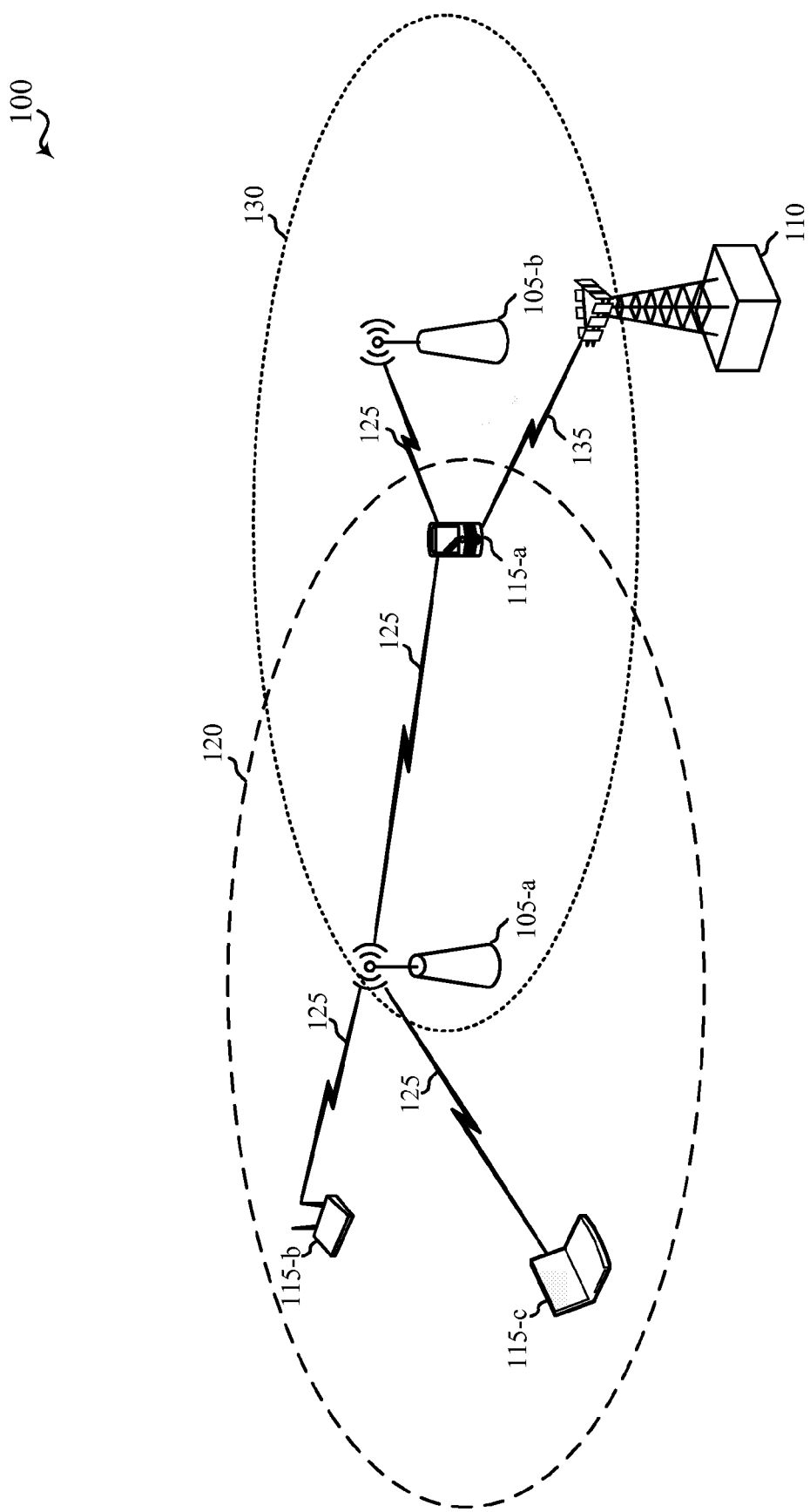
FIG. 1 shows a block diagram of an example of a wireless communications system according to various embodiments.

Referring first to FIG. 1, a block diagram illustrates an example of a wireless network 100 which may provide access to one or more WLANs and/or WANs. The network 100 may include WLAN or WiFi access points (APs) 105 and wireless client devices 115. WLAN or WiFi APs 105 may provide network access according to wireless protocols that, for example, adhere to at least one of the IEEE 802.11 family of standards. The network 100 may also include cellular base stations 110 which may provide cellular communications with one or more of the client devices 115. While only two APs 105-*a* and 105-*b* are illustrated, additional APs may exist in various examples. Likewise, while only one base station 110 is illustrated, additional base stations may exist in various examples.

The client devices 115, also referred to as wireless stations, stations, or STAs, may be distributed or deployed within a coverage area 120 or 130 of access points 105-*a* or 105-*b*, respectively. Each of the stations 115 may associate and communicate using communication links 125 with one of the APs 105, and/or may associate and communicate using communication links 135 with base station 110. As illustrated in FIG. 1, a station 115-*a* may be covered by more than one AP 105 and can therefore associate with different APs 105 and/or different WANs through the different APs 105 or base station 110 at different times depending on which one provides a more suitable connection. A single access point 105 and an associated set of stations 115 may be referred to as a basic service set (BSS). An extended service set (ESS) is a set of connected BSSs. A distribution system (DS) (not shown) is used to connect access points in an extended service set.

The access point 105 may wirelessly communicate with the devices 115 via one or more antennas. The access point 105 may communicate with the devices 115 under the control of an access point controller (not shown) via multiple carriers. Each access point 105 may provide communication coverage for a respective geographic area. In some embodiments, an access point 105 may be referred to as a base station, a radio base station, a basic service set (BSS), an extended service set (ESS), or some other suitable terminology. A coverage area 120 for an access point 105 may be divided into sectors making up only a portion of the coverage area (not shown). The network 100 may include access points 105 of different types (e.g., metropolitan area, home network, etc.), with varying sizes of coverage areas and overlapping coverage areas for different technologies.

The devices 115 may be dispersed throughout the coverage areas 120, 130. Each device 115 may be stationary or mobile. In one configuration, the devices 115 may be able to communicate with different types of access points via links 125, or with one or more different base station(s) 110 via links 135. The devices 115 may be referred to as mobile stations (MSs), mobile devices, stations (STAs), access terminals (ATs), user equipment (UE), subscriber stations (SSs), or subscriber units. The devices 115 may include cellular phones and wireless communications devices, but may also include personal digital assistants (PDAs), other handheld devices, wearable devices, netbooks, notebook computers, tablet computers, etc.

The communication links 125 shown in network 100 may include uplinks (ULs) for uplink transmissions from a device 115 to an access point 105, and/or downlinks (DLs) for downlink transmissions, from an access point 105 to a device 115. Similarly, communication link 135 shown in network 100 may include uplinks (ULs) for uplink transmissions from a device 115 to a base station 110, and/or downlinks (DLs) for downlink transmissions, from a base station 110 to a device 115. The downlink transmissions may also be called forward link transmissions, while the uplink transmissions may also be called reverse link transmissions. In the context of devices 115, according to some examples, one or more of the devices may determine a quality estimation of a WLAN. The quality estimation may be based on a combination of one or more load quality parameters and/or one or more WAN metrics, for example, and may be used to determine whether the device 115 should access a WAN through one of APs 105 or base station 110.

Focusing on a particular device 115-a and the illustrated AP 105-a with coverage area 120, AP 105-b with coverage area 130, and base station 110, the device 115-a may be able to communicate through APs 105-a or 105-b, as well as through base station 110. Each AP 105-a and 105-b may provide access to different WLANs, which may be associated with different WANs. Likewise, base station 110 may provide access to a different WAN, according to some examples. In order to provide enhanced quality of service, device 115-a may, for example, determine a load quality of a BSS for each AP 105-a, and determine one or more WAN metrics associated with the WLAN of each AP 105-a and 105-b. Based on the load quality and WAN metric(s), the device 115-a may determine if each particular WLAN satisfies a threshold for providing access to device 115-a.

When it is determined that the load quality of the BSS and the one or more WAN metrics associated with the WLAN satisfy the threshold, device 115-a may store an indicator for the WLAN for future use in determining whether the WLAN is acceptable for association. If device 115-a determines that either the load quality of the BSS or the one or more WAN metrics, or a combination thereof, associated with the WLAN fail to satisfy the threshold, device 115-a may blacklist the WLAN. Such load quality and WAN metric determinations may be made prior to association with the WLAN, and/or periodically following association with the WLAN.

Through evaluation of such thresholds and associations with various WLANs, mobile device 115-a that is connected to a WAN via base station 110 may automatically join a WLAN through an associated AP 105 whenever the mobile device 115-a enters a coverage area of an associated AP 105. Such actions may provide better bandwidth and services-on-demand to a user of mobile device 115-a, while also alleviating traffic on a cellular network associated with an operator of base station 110. One example of such automatic switching from cellular network connectivity to WLAN network connectivity is Hotspot 2.0, which is based on the IEEE 802.11u standard and may be used to provide cellular-like roaming using WLANs. If a station 115 supports 802.11u, and is subscribed to a Hotspot 2.0 service, the station 115 may automatically connect to a WLAN through an available AP, and may roam between multiple APs.

Figure 2:
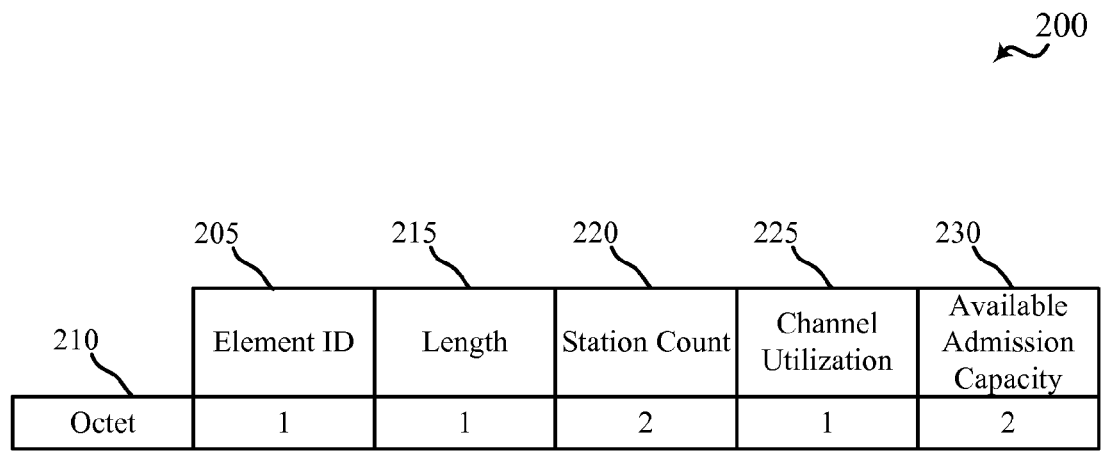
FIG. 2 is a block diagram of a BSS load element in a beacon frame according to various embodiments.

Load quality of a BSS may be determined according to one of a number of techniques. In some examples, information may be provided in a BSS load element such as illustrated in FIG. 2. Such a BSS load element may be provided by an AP, such as an AP 105 of FIG. 1, for example. In FIG. 2, a BSS load element 200 may be periodically transmitted by an AP during a beacon frame. The BSS load element 200 may have a number of fields containing one or more octets 210 of data. In the example BSS load element 200, an element ID 205 may include an identification that the element is a BSS load element, and a length field 215 may include data related to the length of the BSS load element 200. A station count field 220 may include two octets of data indicating a total number of stations currently associated with the BSS. A channel utilization field 225 may include one octet of data indicating a percentage of time, linearly scaled with 255 representing 100%, that the AP sensed the medium was busy such as through, for example, a calculation according to the following equation:

$$\left[ \frac{ChannelBusyTime \text{ (in msec)}}{ChannelUtilizationBeaconIntervals} \times BeaconPeriod \times 1024 \right] \times 255$$

Where ChannelUtilizationBeaconIntervals is a number of consecutive beacon intervals during which the channel busy time is measured; and BeaconPeriod is the time interval at which the AP should send beacons if the channel is idle, in unit of Time Units (TU), where each Time Unit is 1024 msec, in this example. Finally, BSS load element 200 includes an available admission capacity field 230, which may include two octets of data representing a proportion of time on the wireless medium, scaled linearly in units of 32 μs/s from 0 (0% available time) to 31250 (100% available time). One or more of the station count 220, channel utilization 225, or available transmission capacity 230 may be used, alone or in combination, to determine a BSS load quality according to various embodiments, as will be described in more detail below.

Figure 3:
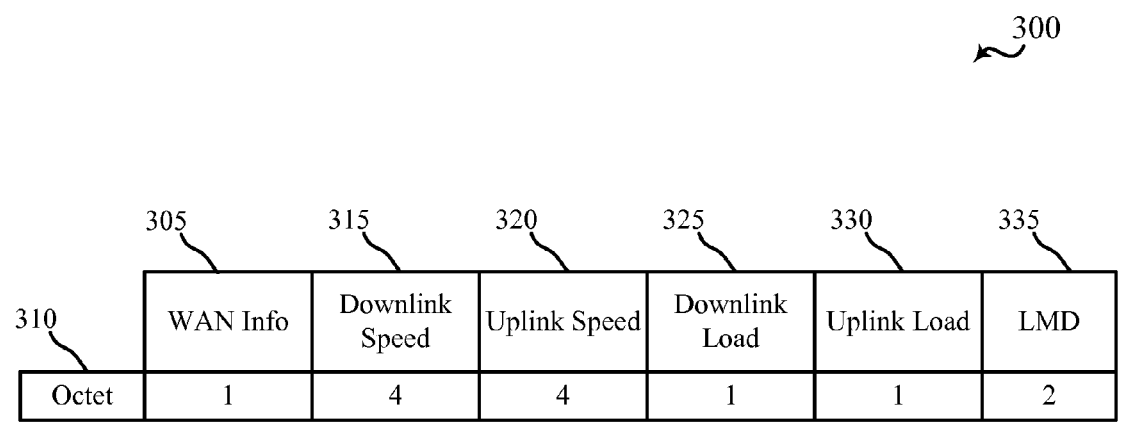
FIG. 3 is a block diagram of a WAN metrics element according to various embodiments.

The one or more WAN metric(s) also may be determined according to one of a number of techniques. In some examples, WAN metric information may be provided in a WAN metrics element 300 such as illustrated in FIG. 3. Such a WAN metrics element may be provided by an AP such as an AP 105 of FIG. 1, for example. A WAN metrics element may be transmitted by an AP as part of an access network query protocol (ANQP), for example. An ANQP is a query and response protocol utilized by STAs (such as devices 115 of FIG. 1) to discover available WLAN hotspots and to authenticate the stations using hotspot-supported extensible authentication protocol (EAP) mechanisms. The WAN metrics element 300 may have a number of fields containing one or more octets 310 of data. In the example WAN metrics element 300, a WAN information field 305 may provide information related to the WAN and may include one octet of data representing information to, for example, indicate link status (e.g., 0-reserved, 1-link up, 2-link down, 3-link in test state), a symmetric link flag indicating whether the AP provides a same speed at downlink and uplink directions, and an at capacity indicating whether the WAN is at capacity and no more mobile device will be permitted.

A downlink speed field 315 may include four octets of data representing an estimate of WAN backhaul link current downlink speed, in kbps, or an indication of an unknown speed, which in some examples is represented by a value of zero. Uplink speed field 320 may include four octets of data representing an estimate of WAN backhaul link current uplink speed, in kbps, or an indication of an unknown speed, which in some examples is represented by a value of zero. A downlink load field 325 may include one octet of data representing a current percentage loading of a downlink WAN connection, scaled linearly with 255 equating to 100%, as measured over an interval of a signaled load measurement duration. The downlink load field 325 may also indicate that the downlink load is unknown, which may be represented by a value of zero. An uplink load field 330 may include one octet of data representing a current percentage loading of the uplink WAN connection, scaled linearly with 255 equating to 100%, as measured over the signaled load measurement duration interval. The uplink load field 330 may also indicate that the uplink load is unknown, which may be represented by a value of zero. Finally, load measurement duration (LMD) field 335 may include two octets of data representing a duration over which the reported downlink load and uplink load is measured, in units of 0.1 second. The LMD field 335 may also indicate that the LMD is unknown, which may be represented by a value of zero.

According to some examples, one or more STAs, such as devices 115 of FIG. 1 for example, may operate to automatically connect to a WLAN from a cellular connection with a cellular base station in the event that the STA comes within a coverage area of an AP that may associated with the STA, or has previously been associated with the STA. In some examples, Hotspot 2.0 protocols may be utilized in which subscription and policy provisioning may be specified by using Open Mobile Alliance (OMA) device management (DM) or Simple Object Access Protocol (SOAP) XML protocols. In such examples, a number of management objects (MOs) may be provided that provide configuration of BSS Load and WAN Metrics control. Such MOs may include a maximum BSS load value, which may indicate a STA is permitted to join any AP in an ESS having a channel utilization value less than the maximum BSS load value. Such MOs may also include a network type policy, that specifies the type of network, such as "home" or "roaming," for example, for which the policy applies.

The MOs may further include backhaul threshold and downlink bandwidth policies, which may specify the minimum available downlink bandwidth (in kps) calculated based on the downlink speed and backhaul load. In some examples, a mobile device may try to join any AP having a backhaul available downlink bandwidth greater than or equal to the downlink bandwidth value. The MOs may further include backhaul threshold and uplink bandwidth policies, which may specify the minimum available uplink bandwidth (in kps) calculated based on the uplink speed and backhaul load. In some examples, a mobile device may try to join any AP having a backhaul available uplink bandwidth greater than or equal to the uplink bandwidth value.

Additionally, in some examples, a WiFi quality estimation (WQE) may be used, at least in part, to determine if a WLAN or a cellular network should be selected to route a new TCP connection. WQE may be performed by a STA, such as a device 115 of FIG. 1. In some embodiments, a connectivity engine (CnE) module within a STA may perform WQE, as will be discussed in more detail below. WQE may measure a number of metrics, and detect available Internet connectivity, which may be used to help improve system selection. In some examples, a WLAN may be selected based on a number of criteria, including, for example, airlink quality, internet connectivity detection (ICD), and a backhaul quality estimation (BQE). Airlink quality may be determined based on a channel quality estimation (CQE), which may determine that an airlink quality is above a threshold value. Such a determination may be made, in some examples, according to the equation:

$$RSSI \geq Th_{RSSI} \text{ AND } (\alpha_1 * RETRY + \alpha_2 * MULTI\_RETRY + \alpha_3 * LOSS + \alpha_4 * ACK\_FAIL) \leq Th_{MAC},$$

Where the $\alpha$ values and thresholds $Th_{RSSI}$ and $Th_{MAC}$ may be predetermined values, and CQE may be good when the outcome of the equation is true. ICD is a determination of whether the WLAN can connect to Internet. A backhaul rate for the WLAN may be determined to be good or bad based on the BQE, which may determine that a bit rate of the WLAN is greater than a defined threshold $Th_{RAT}$, according to some examples.

The metrics CQE, ICD, and BQE used in the WQE may be periodically determined and updated. In some examples, CQE counters are updated continuously, and the metric may be updated once per second, the ICD metrics may be updated once per 60 seconds, and a passive BQE may be measured once per 5 seconds. In some examples, a hysteresis value may be enabled in order to help prevent a ping-pong between selection of a WLAN or cellular WAN for a new connection. For example, a hysteresis timer may be initiated for locking on a WLAN once the WLAN is selected, which may prevent reselection back to a cellular WAN for the duration of the timer. Such a time period may be, for example, 10 seconds.

Figure 4A:
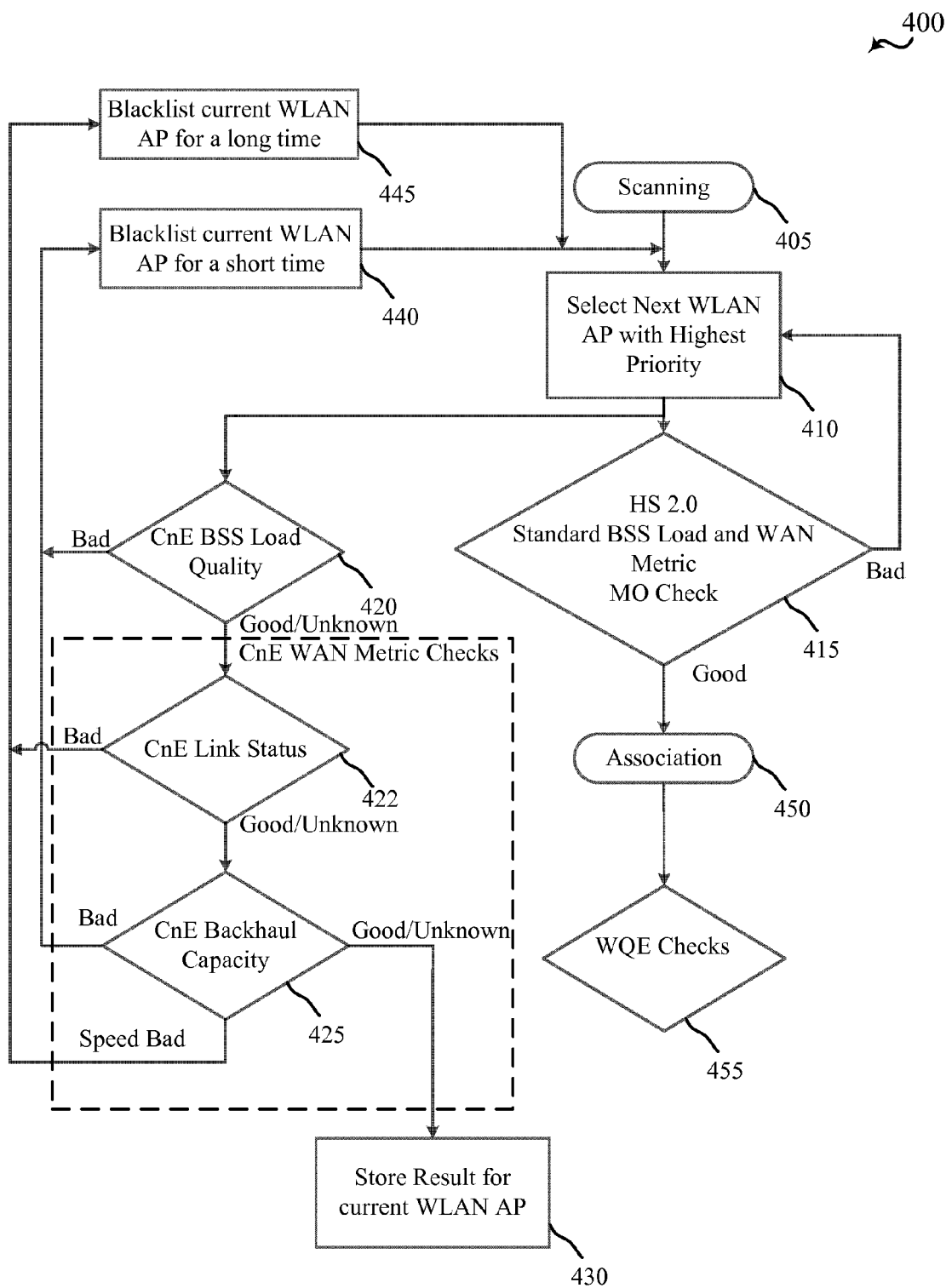
FIG. 4A is a flowchart of a method for determining a quality estimation of a WLAN according to various embodiments.

According to some embodiments, a STA, such as a device 115 of FIG. 1, may perform various operations to measure metrics of a WLAN. FIG. 4A is a flowchart of a method 400 for determining a quality estimation of a WLAN according to various embodiments. Initially, at block 405, the STA performs scanning operations to determine if the STA is within a coverage area of one or more WLAN AP. Scanning operations may include monitoring for one or more beacon frames from APs. Such scanning operations may be performed while a STA is using a cellular WAN, also referred to as a wireless WAN or WWAN, for current TCP connections, or while a STA is using a WLAN for current TCP connections. At block 410, a WLAN AP is selected for evaluation. The WLAN AP that is selected may be, in the event that the STA is within coverage areas of multiple WLAN APs, a WLAN AP having a highest priority in a priority indication that may be provided by one or more APs. In the event that a STA is within the coverage area of a single AP, the STA may select that particular AP. At block 415, in this example, a BSS load and WAN metric management object (MO) check may be performed, such as a Hotspot 2.0 procedure, in order to determine if the WLAN is suitable for use in new data connections for the STA. If the MO check of block 415 is bad, the STA performs the operations of block 410 again to select a different WLAN AP.

In parallel with the operations of block 415, the STA may perform a BSS load quality check, as indicated at block 420. Such a load quality check may be performed, for example, by a CnE module of a STA. The operations of a BSS load quality may include, for example, comparison of various metrics such as provided in a BSS load element provided in a beacon frame from the WLAN AP, such as described above in FIG. 2. In some embodiments, a BSS load quality check may include identifying a number of devices associated with the BSS of the selected WLAN AP, and determining a channel utilization of the associated WLAN, the channel utilization being based at least in part on the identified number of devices. The BSS load quality check may also include, for example, determining an available channel capacity of the associated WLAN, the available channel capacity being based at least in part on the identified number of devices associated with the BSS and the determined channel utilization of the WLAN. In some embodiments, the number of devices currently associated with the BSS may be represented in the one or more beacon frames as a ratio of a number of active devices to a total number of devices associated with the BSS. The operations of a BSS load quality check will be described in more detail below.

If the result of the BSS load quality check is bad, the STA may blacklist the WLAN AP for a relatively short time period, as indicated at block 440. The relatively short time period during which the WLAN AP is blacklisted may be selected based on particular networks and applications. In some examples, the short time period may be on the order of several minutes, although longer or shorter durations may be implemented according to various examples. If the result of the BSS load quality check is good or unknown, the STA may, at blocks 422 and 425, perform WAN metric checks. Such WAN metric checks may be performed, for example, by a CnE module of a STA. The operations of a WAN metric quality may include, for example, comparison of various metrics such as provided in a WAN metrics element from the WLAN AP, such as described above in FIG. 3. In some embodiments, one or more WAN metrics may include a link status check 422 and a backhaul capacity check 425. A link status may indicate, for example, that a WAN link of the WLAN AP is up or down, and may also include a trust value indicating whether the AP is trusted or not. If the link status check 422 indicates that the link status does not satisfy threshold criteria, and/or that the WLAN AP is not trusted, the result of the WAN metric check is bad, and the STA may blacklist the WLAN AP for a relatively long time according to block 445. If the link status check is good or unknown, the STA stores the result for the WLAN AP and may perform a backhaul capacity check, as indicated at block 425. If the backhaul capacity check is good or unknown, the STA stores the result for the WLAN AP, as indicated at block 430. If the CnE BSS load quality check 420 of the CnE backhaul capacity check are bad, the STA may blacklist the current WLAN AP for a relatively short time, as indicated at block 440. If CnE backhaul capacity check 425 indicates the speed is bad, the STA may blacklist the WAN AP for a relatively long period of time, according to block 445. The relatively long period of time during which the WLAN AP is blacklisted may be selected based on particular networks and applications.

If the various BSS load quality, WAN metrics, and MO checks of blocks 420, 422, 425, and 415, respectively, are good, the STA is associated with the WLAN AP, as indicated at block 450. Following association, the STA may perform periodic WiFi quality estimation (WQE), as indicated at block 455. WQE may be used, at least in part, to determine if the associated WLAN or WWAN should be selected to route a new TCP data connection. WQE may be performed, in some embodiments, by a CnE module of a STA. Various WQE checks will be described in more detail below. Thus, a STA may perform a number of quality checks and associate with a WLAN in order to provide relatively high quality connections to a STA and offload one or more data connections from a WWAN.

Figure 4B:
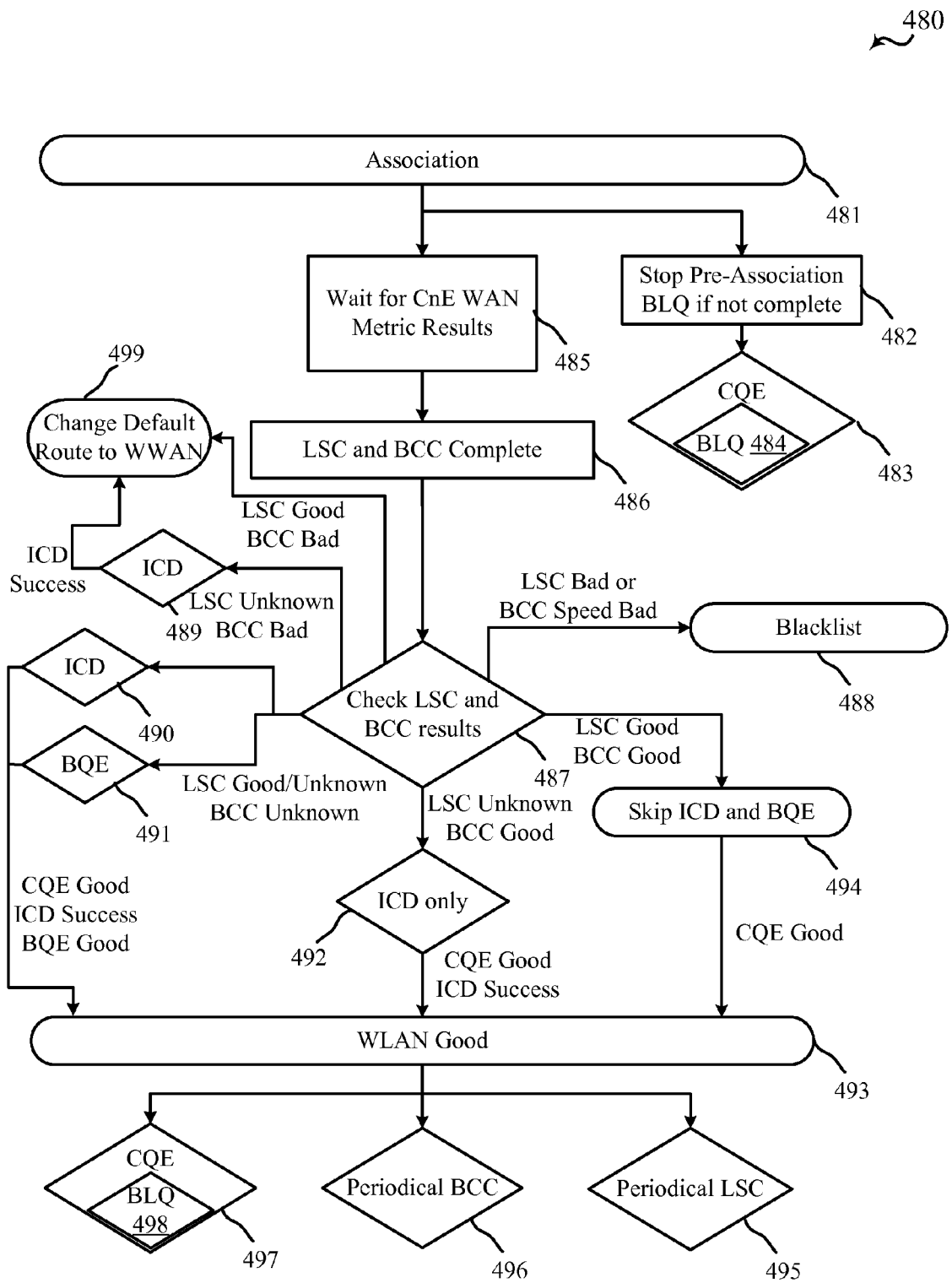
FIG. 4B illustrates a flowchart of a method for determining a quality estimation of a WLAN following association, according to various embodiments.

FIG. 4B illustrates a flowchart of a method 480 for determining a quality estimation of a WLAN following association, according to various embodiments. Initially, at block 481, a WLAN may be associated with a STA. According to some embodiments, the STA, such as a device 115 of FIG. 1, may have performed various operations to measure metrics of a WLAN and associate the WLAN, such as the operations of FIG. 4A, for example. At block 482, the STA may stop pre-associated BLQ if the process has not yet completed. The STA may then, at block 483, perform CQE checks, including BLQ checks 484. The CQE and BLQ checks of blocks 482 and 484, and operations based on the outcomes of the checks, will be described in further detail below.

At block 485, the STA may wait for CnE WAN metric results. At block 486, the STA may determine that the LSC and BCC are complete, and then check the LSC and BCC results as indicated at block 487. As discussed, the results of the LSC and BCC checks may produce a number of potential outcomes. If the outcome is that the LSC or BCC speed is bad, the STA may blacklist the WLAN, as indicated at block 488. The time that a WLAN stays on a blacklist may be determined based on the particular deployment and/or network characteristics. If it is determined at block 487 that the LSC is good and the BCC is bad, the STA may stop using WLAN and change the default route to the WWAN, as indicated at block 499. If the LSC is unknown and the BCC is bad at block 487, the STA may perform an internet connectivity detection (ICD) check, as indicated at block 489. If the ICD is successful, the STA may change the default route to the WWAN, as indicated at block 499. If the LSC and BCC indicate that the LSC is good or unknown, and the BCC is unknown, the STA may initiate an ICD at block 490, and a backhaul quality estimation (BQE) check at block 491. ICD 490 and BQE 491 checks may be performed by a CnE module of a STA, for example, and will be described in more detail below.

If it is determined at block 487 that the LSC is unknown and the BCC is good, the STA may perform an ICD only check, indicated at block 492. If the results of the checks of blocks 490, 491, or 492 indicate that BQE and/or CQE are good, and the ICD check was a success, the STA may store an indication that the WLAN is good, as indicated at block 493. Similarly, if it is determined at block 487 that the LSC and BCC checks are good, the STA may skip the ICD and BQE checks, as indicated at block 494 and store an indication that the WLAN is good at block 493. Following the indication that the WLAN is good, the STA may perform periodical LSC and BCC checks, as indicated at blocks 495 and 496, and may also perform periodical CQE checks as indicated at block 497. The periodical CQE checks may include BLQ checks, as indicated at block 498.

Figure 5:
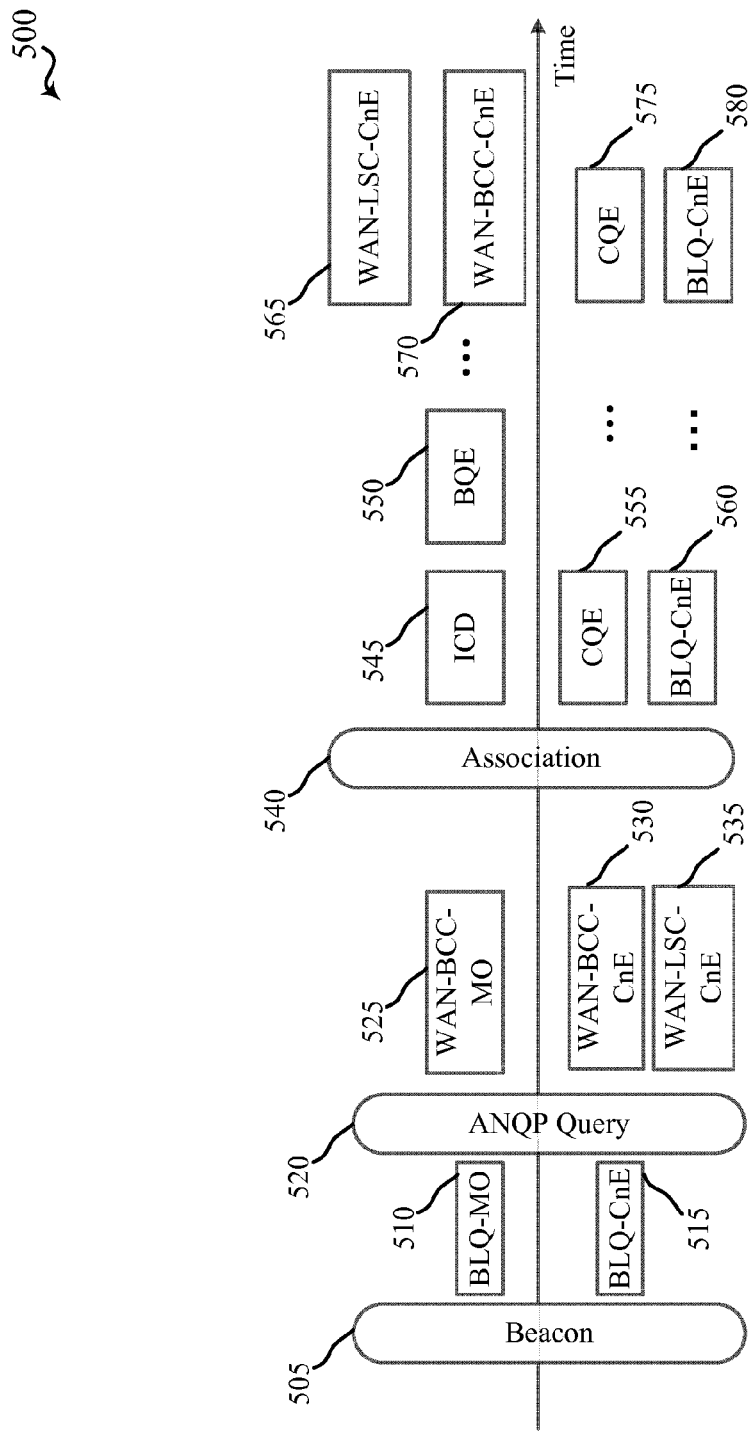
FIG. 5 is a timing diagram of exemplary operations for determining a quality estimation of a WLAN according to various embodiments.

With reference now to FIG. 5, a timing diagram 500 of various of the operations such as described above is illustrated. Initially, a beacon frame 505 may be transmitted by an AP, such as an AP 105 of FIG. 1, for example. An STA, such as a device 115 of FIG. 1, for example, may receive the beacon frame and initial metric checks. In the example of FIG. 5, a STA may perform BLQ checks according to MOs (BLQ-MO), as indicated at block 510. Such BLQ-MO checks 510 may be performed according to a Hotspot 2.0 procedure, for example. A STA may also perform BSS load quality (BLQ) checks such as the CnE checks of blocks 420 and 460 of FIG. 4 (BLQ CnE), as indicated at block 515.

If the BLQ-MO 510 and BLQ-CnE 515 checks are good, the STA may transmit an ANQP query, indicated at 520. ANQP query 520, as discussed above, results in the AP generating and transmitting a WAN metrics element such as described above with respect to FIG. 3. The WAN metrics element may be used to perform a WAN backhaul capacity check (BCC) according to MOs (WAN-BCC-MO) at block 525. Such WAN-BCC-MO checks 525 may be performed according to a Hotspot 2.0 procedure, for example. The WAN metrics element also may be used to perform a WAN backhaul capacity check (BCC) by a CnE module of a STA (WAN-BCC-CnE) at block 530, as well as a WAN link status check (LSC) by the CnE module (WAN-LSC-CnE) at block 535. Such WAN-BCC-CnE 530 and WAN-LSC-CnE 535 checks may include checks such as described with respect to the CnE checks of blocks 425 and 465 of FIG. 4, for example.

In the event that the various checks of blocks 510, 515, 525, 530, and 535 are good, the STA may associate with the WLAN, at 540. Following association, according to some embodiments, the STA may periodically perform additional checks to verify that the association 540 should be maintained. For example, an internet connectivity detection (ICD) may be performed at block 545, and a backhaul quality estimation (BQE) check may be performed at block 550. ICD 545 and BQE 550 checks may be performed by a CnE module of a STA, for example. In some examples, such a CnE module may also perform a CQE check 555, and a BLQ-CnE check 560. Checks 545-560 may be used to confirm that the WLAN continues to provide desired service quality. Furthermore, a STA may have one or more timers that trigger the periodic performance of WAN-LSC-CnE checks 565, WAN-BCC-CnE checks 560, CQE checks 575, and BLQ-CnE checks 580. In the event that one or more checks 545-580 returns a bad result, the STA may discontinue association with the WLAN, such as by blacklisting the WLAN, and connect via a WWAN or a different WLAN for one or more subsequent data connections.

According to some embodiments, the BLQ-CnE metrics, such as used in checks 515, 560, and 580, may be designed to confirm a WLAN meets certain quality thresholds. As mentioned above, a BSS Load element may include information related to channel utilization, available admission capacity, and STA count. According to some embodiments, such information may be used with channel utilization to estimate the available channel capacity. Channel utilization may be measured by an AP in a sliding time window T, and thus the channel utilization may vary for each beacon transmitted by an AP. T may be determined, for example, according to:

$$T = \text{ChannelUtilizationBeaconIntervals} \times \text{BeaconPeriod}$$

In some deployments, ChannelUtilizationBeaconIntervals× BeaconPeriod=50, and BeaconPeriod=100 ms, which yields slide time window T=5 sec. Such a channel utilization may signal the channel condition of the AP.

Available capacity may be determined based on a saturation point (SP) at which a link may not provide any additional data transmission capacity, and may thus represent an upper bound on a capacity for a channel. An available capacity may be determined, in some embodiments, based on a current utilization (CU) as compared to the SP. For example, available capacity may be determined based on the following equation:

$$\text{Available Capacity} = \begin{cases} \left[SP - CU \times \left(1 - \frac{1}{STA_{Count} + I_A}\right)\right] \times PHY_{Rate} \times k & \text{if } CU \leq SP \\ 0 & \text{if } CU > SP \end{cases}$$

In this equation, k is less than one, and represents an overhead factor that may be determined according to a ratio of network layer payload and physical layer frame size. $PHY_{Rate}$ may be estimated from RSSI and the network type. $I_A$ may be set to zero if the STA has an associated WLAN, and may be set to one otherwise, according to some examples.

The BLQ-CnE decision may then be determined based on available capacity, a channel utilization, and/or threshold values associated therewith. In some examples, when detecting a good WLAN, BLQ-CnE may be based on available capacity and the factor k may be adjusted to make the decision relatively more conservative or aggressive. For example, if available capacity is greater than or equal to a BLQ capacity threshold, the BLQ may be determined to be suitable, and the check is good. When detecting a bad WLAN, the STA may be on the WLAN, and therefore may not want to disassociate from the WLAN too quickly, and BLQ may have a high threshold to detect bad WLAN when the channel is so loaded that the STA has relatively few opportunities to transmit. In some examples, current channel utilization is checked at the same time when other CQE tests are performed, although such measurements may be made at other times according to various examples.

In some cases, the channel utilization may go beyond saturation point but the STA may still be happy, because a new transmission may not be started or required, for example. In some examples, channel utilization may be monitored according to the following criteria:

If $CU \times (1-1/STA) > BLQ_{CUThreshold}$ AND $T_{CU}$ is not started, the STA may start random timer $T_{CU}$.

If $CU \times (1-1/STA) < BLQ_{CUThreshold} - BLQ_{CUOffset}$ AND $T_{CU}$ is started, the STA may stop $T_{CU}$.

If $CU \times (1-1/STA) > BLQ\_CUThreshold$ AND TCU is expired, the STA may declare BLQ unsuitable.

According to some examples, $T_{CU}$ is a random timer between [0, $T_{CU\_Max}$], where $T_{CU\_Max}$ is a function of RSSI to allow station with poor channel quality to leave a WLAN relatively sooner than compared to situation with relatively good channel quality.

Figure 6:
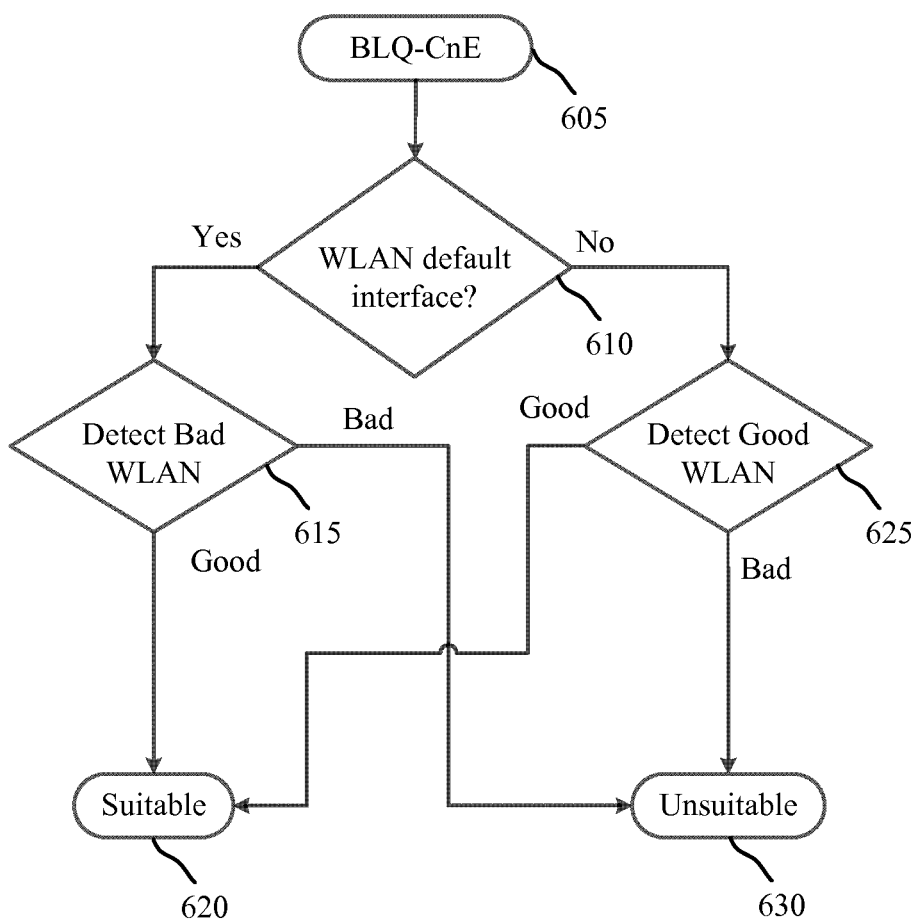
FIG. 6 is a flowchart of a method for determining a BSS load quality (BLQ) for quality estimation of a WLAN according to various embodiments.

With reference now to FIG. 6, a flowchart of a method 600 for BLQ-CnE checks is described according to various embodiments. The method 600 may be performed, for example, by a STA, such as a device 115 of FIG. 1. In the method of FIG. 6, a BLQ-CnE check is initiated at block 605. Such a check may be initiated, for example, based on one or more timers and/or an initial BLQ check prior to association with a WLAN, such as described above. At block 610, it is determined whether the WLAN is the default interface. Such a determination may be made based on whether the WLAN or WWAN is currently being used for new data connections at a station, for example. If the WLAN is the default interface, the station determines if the WLAN is a bad WLAN as indicated at block 615. If the WLAN is determined to be good, an indication is stored that the WLAN is good, or suitable, as indicated at block 620. If the WLAN is determined to be bad at block 615, the WLAN is marked as unsuitable, as indicated at block 630. Such determinations may be made according to the thresholds and metrics such as described above, and as will be described in more detail below.

If the WLAN is not the default interface, the station determines whether the WLAN is good, as indicated at block 625. If the WLAN is determined to be good, an indication is stored that the WLAN is good, or suitable, as indicated at block 620. If the WLAN is determined to be bad at block 615, the WLAN is marked as unsuitable, as indicated at block 630. Such determinations may be made according to the thresholds and metrics such as described above, and as will be described in more detail below.

Detecting suitable WLAN conditions when WLAN is currently not the default interface, at block 625, may include, in some embodiments, performing a periodic check that runs every $T_{MIB}$ seconds. $T_{MIB}$ may be configurable based on particular applications and current conditions of a station. As discussed above, if the WLAN is the default interface, a hysteresis timer, $T_{MACHysteresis}$, may be initiated to reduce potential of ping-pong switching between default interfaces.

If the $T_{MACHysteresis}$ timer has been started, the STA may wait until the timer expires. Following expiration of such a timer (if started), a channel condition may be evaluated. For example, a determination may be made as to whether an $RSSI_{avg}$ exceeds a threshold $RSSI_{AddThreshold}$. If the signal strength exceeds the threshold, a medium access control management information base (MAC-MIB) based decision may be checked to determine that the WLAN is not listed as unsuitable. Finally, if channel utilization is available in beacon from the AP, a BLQ check may be evaluated to determine that the WLAN is suitable.

Detecting suitable WLAN conditions when WLAN is currently the default interface, at block 615, may include, in some embodiments, performing a periodic check that runs every $T_{MIB}$ seconds. $T_{MIB}$ may be configurable based on particular applications and current conditions of a station. Initially, the STA may determine if $RSSI_{avg} < RSSI_{DropThreshold}$ or that BLQ is unsuitable. If either of these conditions are true, then the WLAN is declared to be bad. Otherwise, if the MAC-MIB based decision indicates the WLAN is unsuitable, the WLAN may be declared bad, due to losses at MAC layer, for example. Finally, if $RSSI_{avg}$ is greater than or equal to $RSSI_{MAC\_Timer\_Threshold}$, the STA may start the WLAN hysteresis timer to count up to $T_{MACHysteresis}$, at which point the checks may be performed again.

As discussed above, in addition to BLQ, a STA, such as a device 115 of FIG. 1, for example, may make determinations related to WAN metrics in order to determine whether a WAN should be associated or remain associated. WAN metrics, according to various examples, may be based on various WAN metrics such as may be provided in WAN metrics element 300 as discussed above with respect to FIG. 3. Such WAN metrics may include link status information, indicating whether the link is up, down or in a test state. Such information may be used similarly to ICD, in some examples. Downlink speed and uplink speed metrics may, in some examples, be used similarly to BQE. However, in some cases uplink and downlink speed metrics may not be trustable, because such speeds may be over-estimated due to being based, for example, on backhaul access type (e.g., cable, LAN, T1, LTE, etc.). Downlink and uplink load metrics may be used, which may be communicated using SNMP and/or static values for a particular WLAN. A LMD metric may be used, which may have units of 0.1 s, and may range, for example, between 1 minute and 15 minutes, according to some examples. Additionally, one or more MOs may be used for backhaul speed threshold settings. For example, a DLBandwidth MO may be used as a BQE threshold, and a ULBandwidth may be used as a BQE uplink threshold.

As mentioned above, WAN metric trustability may be questionable based on various factors associated with connection types, etc., of a particular WLAN. In some examples, an AP, such as an AP 105 of FIG. 1, may set one or more WAN metrics value to zeros if the AP cannot provide trustworthy values. Accordingly, if a field in the WAN metrics element has a zero value, the metric may be determined to be untrustworthy. In some examples, some particular ANQP-elements may include content that may indicate which part of the metrics can be trusted, such as separate trustability data for link up, link down, downlink speed, downlink load, uplink speed and/or uplink load. A station may query this information through GAS/ANQP to determine if one or more metrics are trustworthy.

Figure 7:
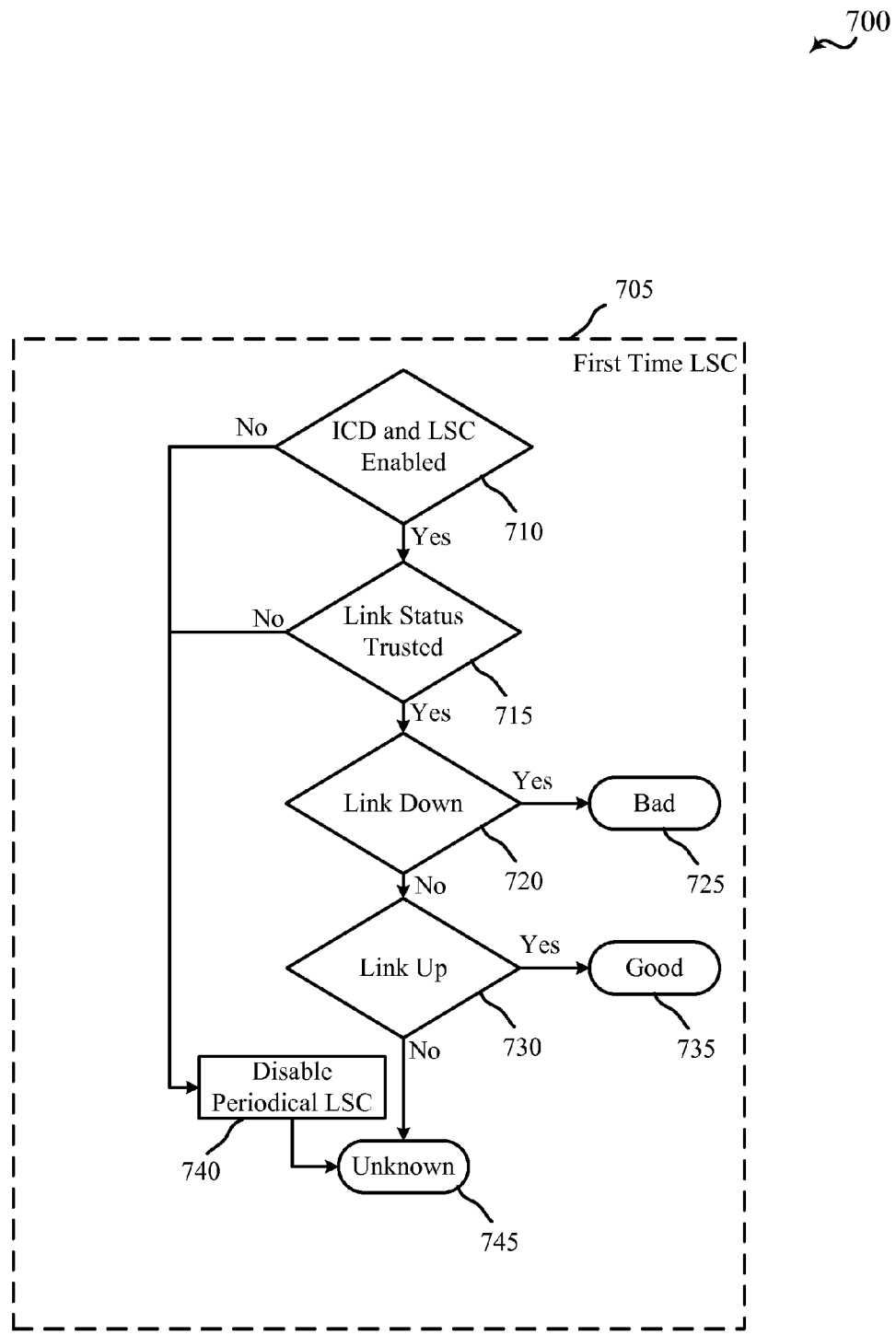
FIG. 7 is a flowchart of a method for performing an initial link status check (LSC) for a WLAN according to various embodiments.

With reference now to FIG. 7, a flowchart of a method 700 for performing an initial link status check (LSC) for a WLAN according to various embodiments is described. The method 700 may be performed, for example, by a STA, such as a device 115 of FIG. 1. The method 700 includes a routine for a first time LSC 705, in which it is determined at block 710 if ICD and LSC are both enabled. If ICD and LSC are enabled, the STA determines at block 715 if the link status is trusted. If the link is trusted, the STA may determine, at block 720, whether the link is down. If the link is down, a bad indication is provided, as indicated at block 725. In such an event, the WLAN AP may be blacklisted, for example, If it is not determined the link is down, the STA may determine if the link is up, as indicated at block 730. If the link is up, a good indication may be provided, as indicated at block 735, at which point the STA may perform one or more other checks such as BCC and/or ICD checks, for example. In some examples, this result may be stored so that if WAN-BCC-CnE has a deterministic result (good, bad or speed bad), and when ICD starts, ICD may directly return ICD SUCCESS without any additional test.

If ICD and/or LSC are not enabled at block 710, or if the link status is not determined to be trusted at block 715, the STA may disable periodical LSC, according to block 740, and an unknown indication may be provided as indicated at block 745. Similarly, if it is not determined at block 730 that the link is up, an unknown indication may be provided as indicated at block 745.

Figure 8:
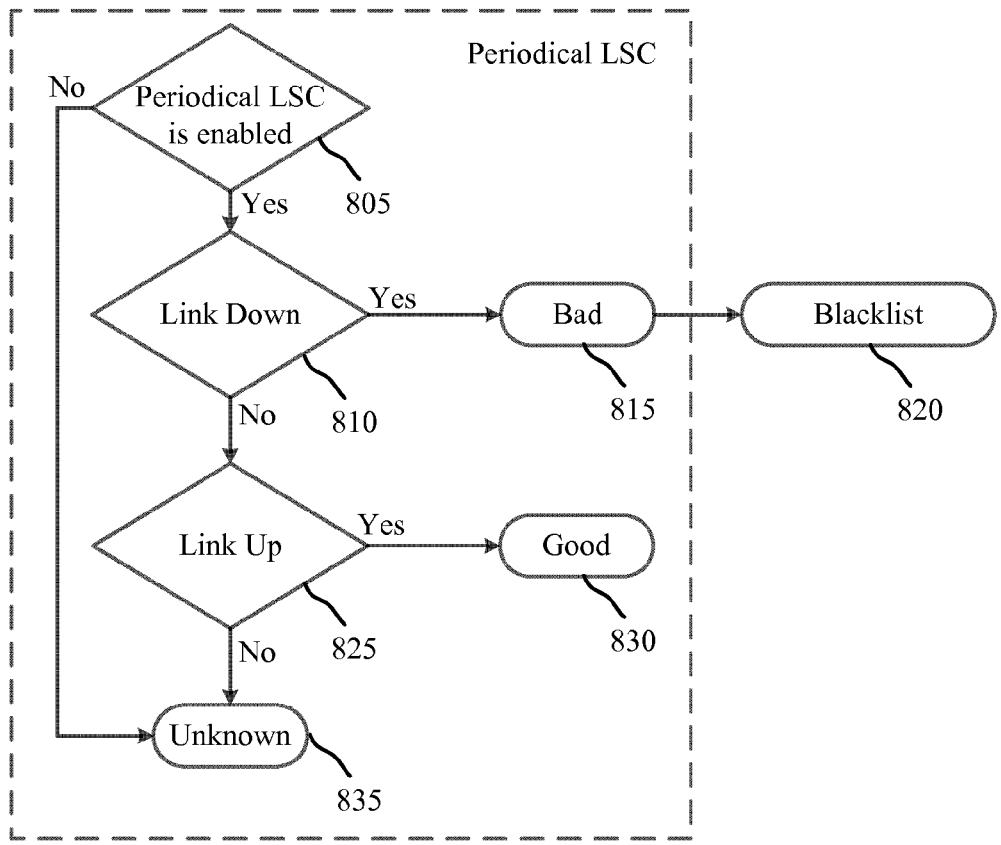
FIG. 8 is a flowchart of a method for performing a periodic LSC for a WLAN according to various embodiments.

With reference now to FIG. 8, a flowchart of a method 800 for performing periodical LSC for a WLAN according to various embodiments is described. The method 800 may be performed, for example, by a STA, such as a device 115 of FIG. 1. Initially, at block 805, it is determined if periodical LSC is enabled. If periodical LSC is not enabled, an unknown indication 835 may be provided as a result of the LSC. If periodical LSC is enabled, the STA may determine, at block 810, whether the link is down. In some examples, a check of trustability is not required, since first time LSC (FIG. 7) will disable Periodical LSC if link status is not trusted. If the link is down, a bad indication 815 is generated and stored, and the WLAN is blacklisted according to block 820. If the link is not determined to be down at block 810, the STA may determine, at block 825, if the link is up. If the link is up, a good indication 830 is generated and stored. If it is not determined that the link is up at block 825, an unknown indication 835 may be provided as a result of the LSC.

Figure 9:
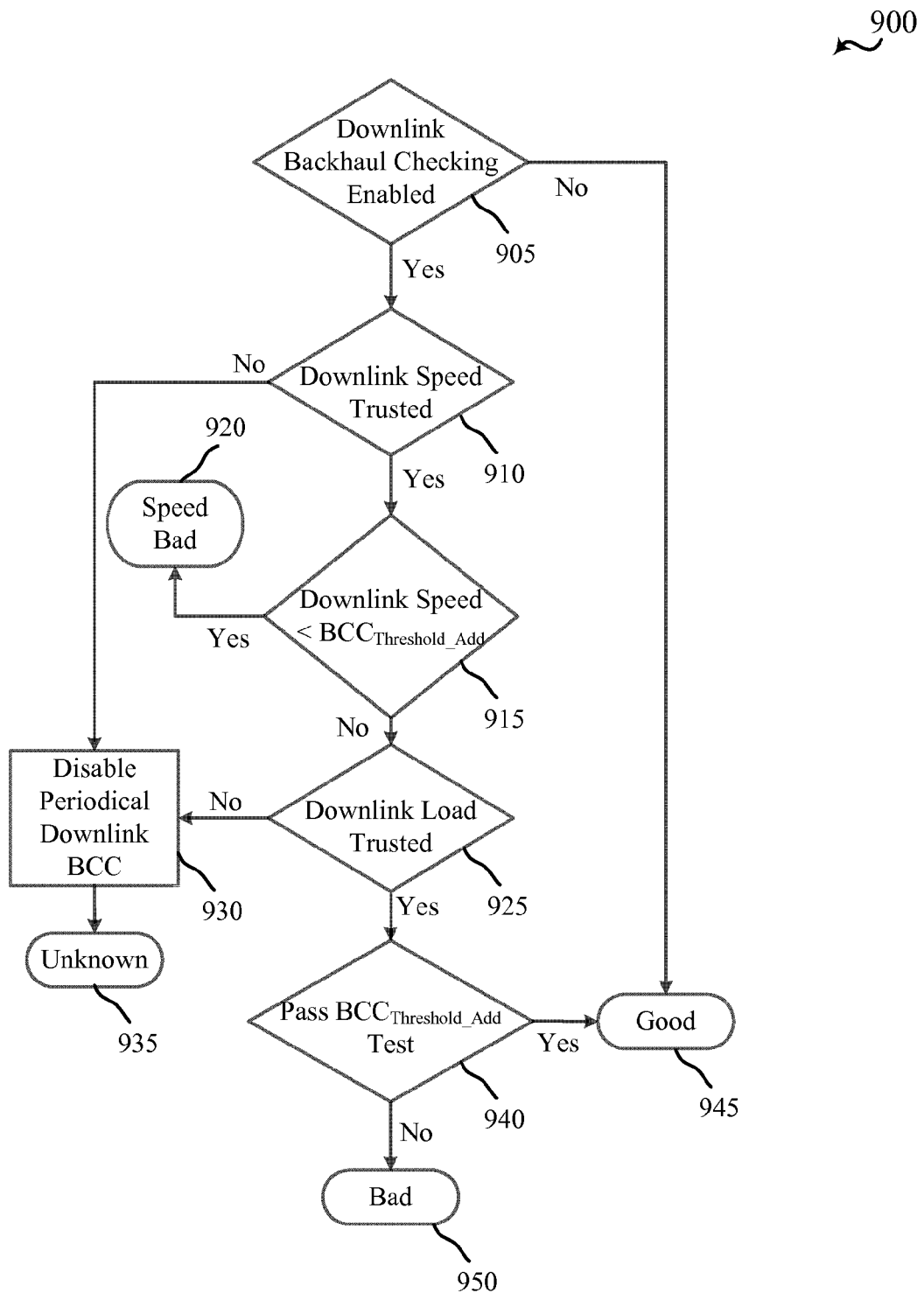
FIG. 9 is a flowchart of a method for performing a backhaul capacity check (BCC) for a WLAN according to various embodiments.

With reference now to FIG. 9, a flowchart of a method 900 for performing a backhaul capacity check (BCC) for a WLAN according to various embodiments is described. The method 900 may be performed, for example, by a STA, such as a device 115 of FIG. 1. While FIG. 9 describes downlink backhaul checking, similar procedures may be performed for uplink backhaul checking Initially, at block 905, it is determined if downlink backhaul checking is enabled. If downlink backhaul checking is not enabled, a good indication 945 is generated, as indicated at block 945. If it is determined if downlink backhaul checking is enabled, it is determined whether the downlink speed reported in WAN metric element is trusted, as noted at block 910. If the downlink speed is not trusted, periodical downlink BCC is disabled, as indicated at block 930, and BCC is returned at unknown at block 935.

If it is determined at block 910 that the downlink speed reported in WAN metric element is trusted, it is determined at block 915 whether the downlink speed is less than an add threshold, $BCC_{Threshold\_Add}$. If the downlink speed is less than this threshold, the speed is determined to be bad, as indicated at block 920. If the downlink speed is greater than or equal to the threshold, a determination is made at block 925 as to whether the downlink load reported in the WAN metrics element is trusted. If the downlink load is not trusted, the operations of blocks 930 and 935 are performed. If the downlink speed is trusted at block 925, is it determined at block 940 whether the downlink load passes add threshold test of $BCC_{Threshold\_Add}$. If the test at block 940 passes, the link is indicated as good at block 945. If the test at block 940 does not pass, the link is indicated as bad at block 945. The test at block 940, in some examples, may determine whether the DownlinkSpeed×(1−downlinkload) is greater than the threshold.

Figure 10:
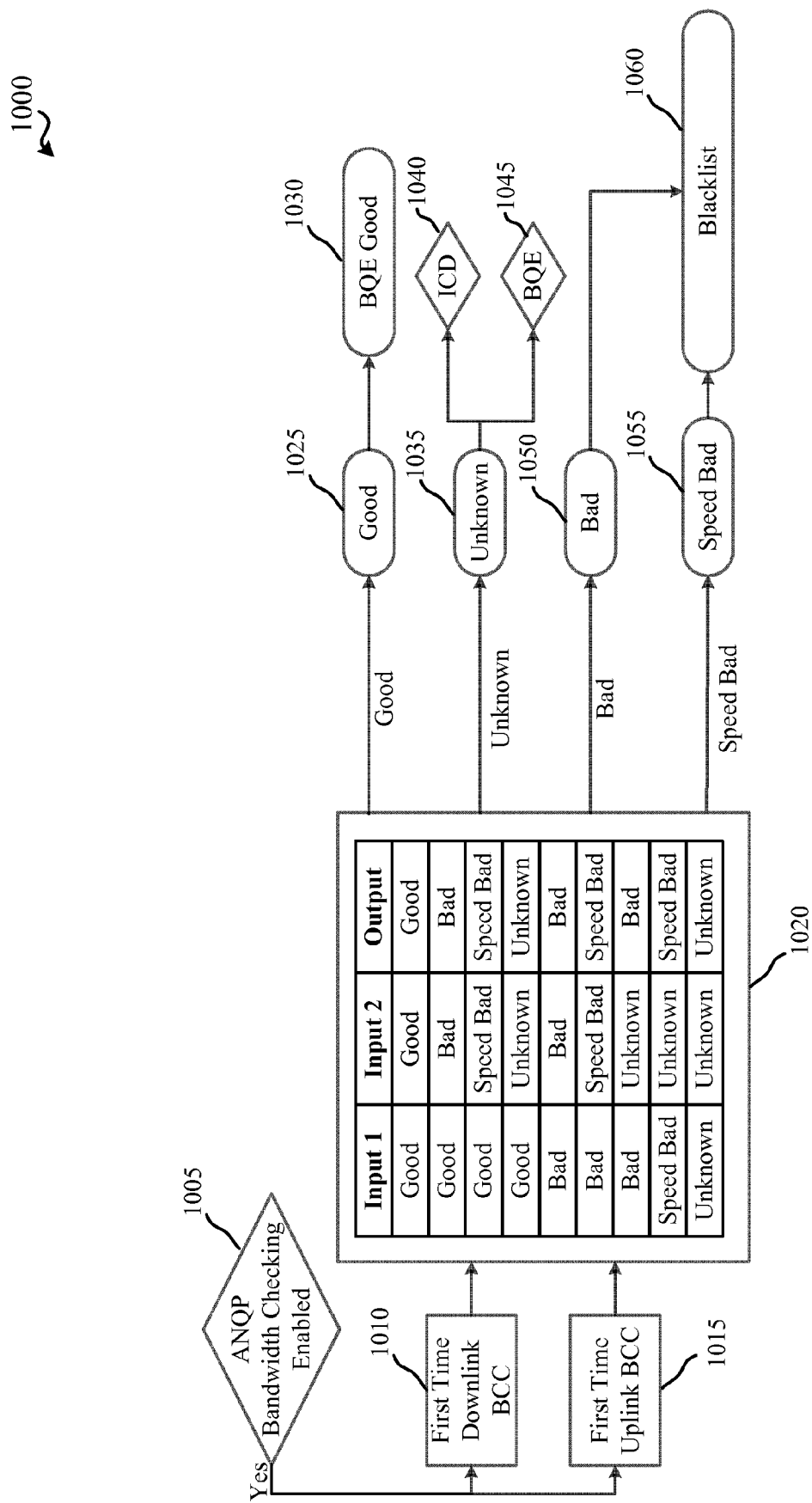
FIG. 10 is a flowchart of a method for performing an initial backhaul capacity check (BCC) for a WLAN according to various embodiments.

With reference now to FIG. 10, a flowchart of a method 1000 for performing an initial backhaul capacity check (BCC) for a WLAN according to various embodiments is described. The method 1000 may be performed, for example, by a STA, such as a device 115 of FIG. 1. Initially, at block 1005, the STA may determine that ANQP bandwidth checking in enabled. If checking is enabled, first time downlink BCC 1010 and first time uplink BCC 1015 may be performed. In some examples, downlink capacity checking and uplink capacity checking may be enabled/disabled separately, in which case an input to lookup table 1020 may be unknown for the particular uplink or downlink input. In the event that both uplink and downlink BCC are disabled, a STA may disable periodical BCC. Otherwise, uplink BCC 1015 and downlink BCC 1010 provide good, bad, or speed bad inputs that may be used to determine an output from lookup table 1020.

If the output of lookup table 1020 is good, a good indication is generated at block 1025, and a BQE good determination is made, at block 1030. If the output of lookup table 1020 is unknown, an unknown indication is generated at block 1035, and the STA may perform both ICD 1040 and BQE 1045 procedures. If the output of lookup table 1020 is bad, a bad indication is generated at block 1050, and the STA may blacklist the WLAN as indicated at block 1060. If the output of lookup table 1020 is speed bad, a speed bad indication is generated at block 1055, and the STA may blacklist the WLAN as indicated at block 1060.

Figure 11:
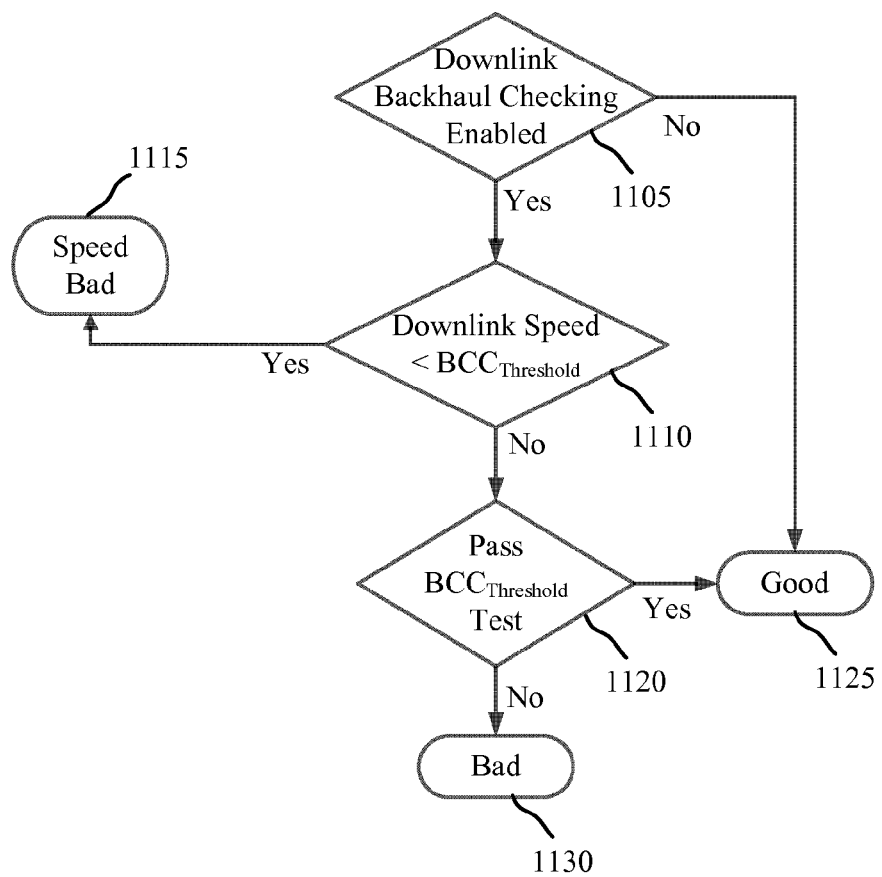
FIG. 11 is a flowchart of a method for performing periodic downlink backhaul capacity check (BCC) for a WLAN according to various embodiments.

With reference now to FIG. 11, a flowchart of a method 1100 for performing an periodical WAN BCC for a WLAN according to various embodiments is described. The method 1100 may be performed, for example, by a STA, such as a device 115 of FIG. 1. According to some examples, such a periodical WAN BCC may run every $T_{WAN}$ seconds. While FIG. 11 describes downlink backhaul checking, similar procedures may be performed for uplink backhaul checking Initially, at block 1105, it is determined if downlink backhaul checking is enabled. If downlink backhaul checking is not enabled, a good indication is generated, as indicated at block 1125. If it is determined if downlink backhaul checking is enabled, it is determined at block 1110 whether the downlink speed is less than a threshold, $BCC_{Threshold}$.

If the downlink speed is less than this threshold, the speed is determined to be bad, as indicated at block 1115. If the downlink speed is greater than or equal to the threshold, a determination is made at block 1120 as to whether the downlink speed passes a BCC threshold test. If the test at block 1120 passes, the link is indicated as good at block 1125. If the test at block 1120 does not pass, the link is indicated as bad at block 1130. The test at block 1120, in some examples, may determine whether the DownlinkSpeed×(1−downlinkload) is greater than threshold $BCC_{Threshold}$. The $BCC_{Threshold}$, in some examples, may have two possible values: $BCC_{Threshold\_Add}$, which may be used when the WLAN is not the default interface, and $BCC_{Threshold\_Drop}$, which may be used when WLAN is the default interface. In some examples, $BCC_{Threshold\_Drop}$ may be less than or equal to $BCC_{Threshold\_Add}$.

Figure 12:
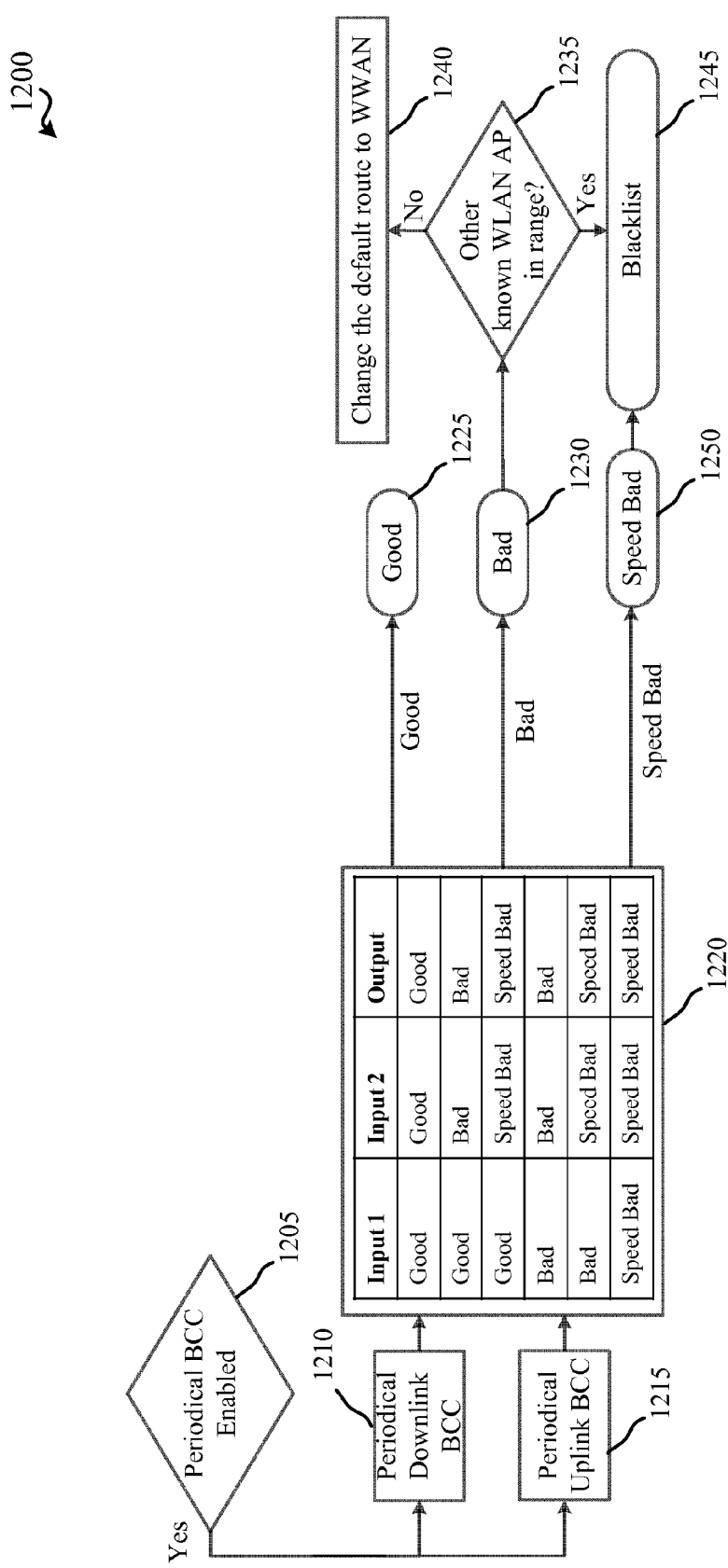
FIG. 12 is a flowchart of a method for performing periodic uplink and downlink BCCs for a WLAN according to various embodiments.

With reference now to FIG. 12, a flowchart of a method 1200 for performing a periodic backhaul capacity check (BCC) for a WLAN according to various embodiments is described. The method 1200 may be performed, for example, by a STA, such as a device 115 of FIG. 1. Initially, at block 1205, the STA may determine that periodical BCC is enabled. If checking is enabled, periodical downlink BCC 1210 and periodical uplink BCC 1215 may be performed. Uplink BCC 1215 and downlink BCC 1210 provide good, bad, or speed bad inputs that may be used to determine an output from lookup table 1220.

If the output of lookup table 1220 is good, a good indication is generated at block 1225. If the output of lookup table 1220 is bad, a bad indication is generated at block 1230, and the STA may determine if another known WLAN AP is in range, as indicated at block 1235. If no other WLAN AP is in range, the STA may change the default route for data connections to the WWAN, as indicated at block 1240. If other WLAN APs are in range, the STA may blacklist the WLAN, as indicated at block 1245. If the output of lookup table 1220 is speed bad, a speed bad indication is generated at block 1250, and the STA may blacklist the WLAN as indicated at block 1245.

Thus, a STA may perform various checks in determining whether to associate with a WLAN. As discussed above, a periodical WAN-LSC-CnE and WAN-BCC-CnE may run once every $T_{WAN}$ seconds, which may be a time period that is a random or pseudo-random time period set between upper and lower bounds, according to some examples. For BCC thresholds, according to various examples, the thresholds may be set differently based on whether the STA is associated with a WLAN. In some embodiments, if the BCC-CnE procedure returns bad output, and if there is no other remembered SSIDs for other WLAN APs, a STA may change the default interface to WWAN but remain associated with the WLAN AP. If the STA does have one or more other stores SSIDs of other WLAN APs that are not blacklisted, the STA may blacklist the current SSID of the tested WLAN AP.

Figure 13A:
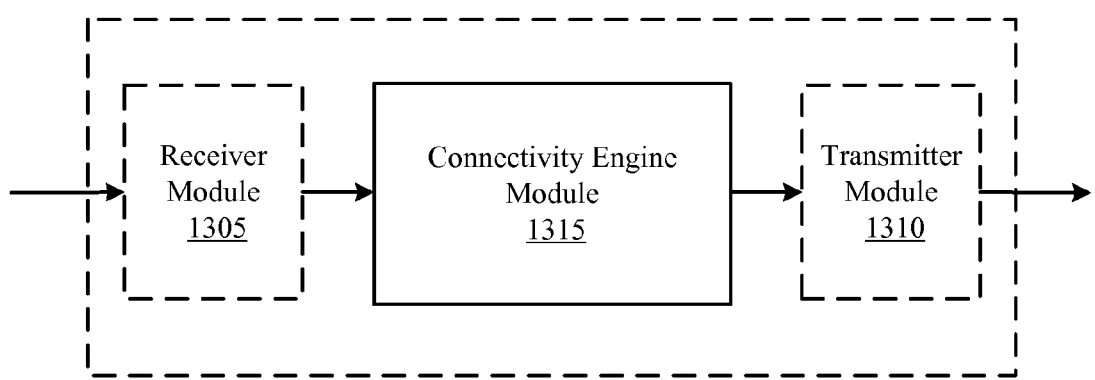
FIG. 13A shows a block diagram of an example of a device configured for determining a quality estimation of a WLAN according to various embodiments.

FIG. 13A shows a block diagram illustrating an example of a device 1300-a that may be configured for link quality estimation operations according to various embodiments. The device 1300-a may be an example of one or more aspects of the devices 115 described with reference to FIG. 1. The device 1300-a may include a receiver module 1305, a connectivity engine (CnE) module 1315, and/or a transmitter module 1310, each of which, in embodiments, may be communicably coupled with any or all of the other modules. The device 1300-a may also be a processor.

The components of the device 1300-a may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 1305 may include any number of receivers, and in some cases may include one or more cellular receivers and/or a wireless local area network (WLAN) receiver. Example cellular receivers include an LTE/LTE-A, CDMA, and/or GSM receiver. The receiver module 1305 may be used to receive various types of data and/or control signals over a wireless communications system such as the wireless network 100 shown in FIG. 1. As a result, the receiver module 1305, either alone or in combination with other modules, may be means for communicating as described herein.

The transmitter module 1310 may include any number of transmitters, and in some cases may include one or more cellular transmitters and/or a WLAN transmitter. Example cellular transmitters include an LTE/LTE-A and/or GSM transmitter. The transmitter module 1310 may be used to transmit various types of data and/or control signals over a wireless communications system such as the wireless network 100. As a result, the transmitter module 1310, either alone or in combination with other modules, also may be means for communicating as described herein. The connectivity engine module 1315 may perform various functions, including the management of the various methods and checks as described above with respect to FIGS. 1 through 12. As such, the connectivity engine module 1315, either alone or in combination with other modules, may be means for performing such functions as described herein.

Figure 13B:
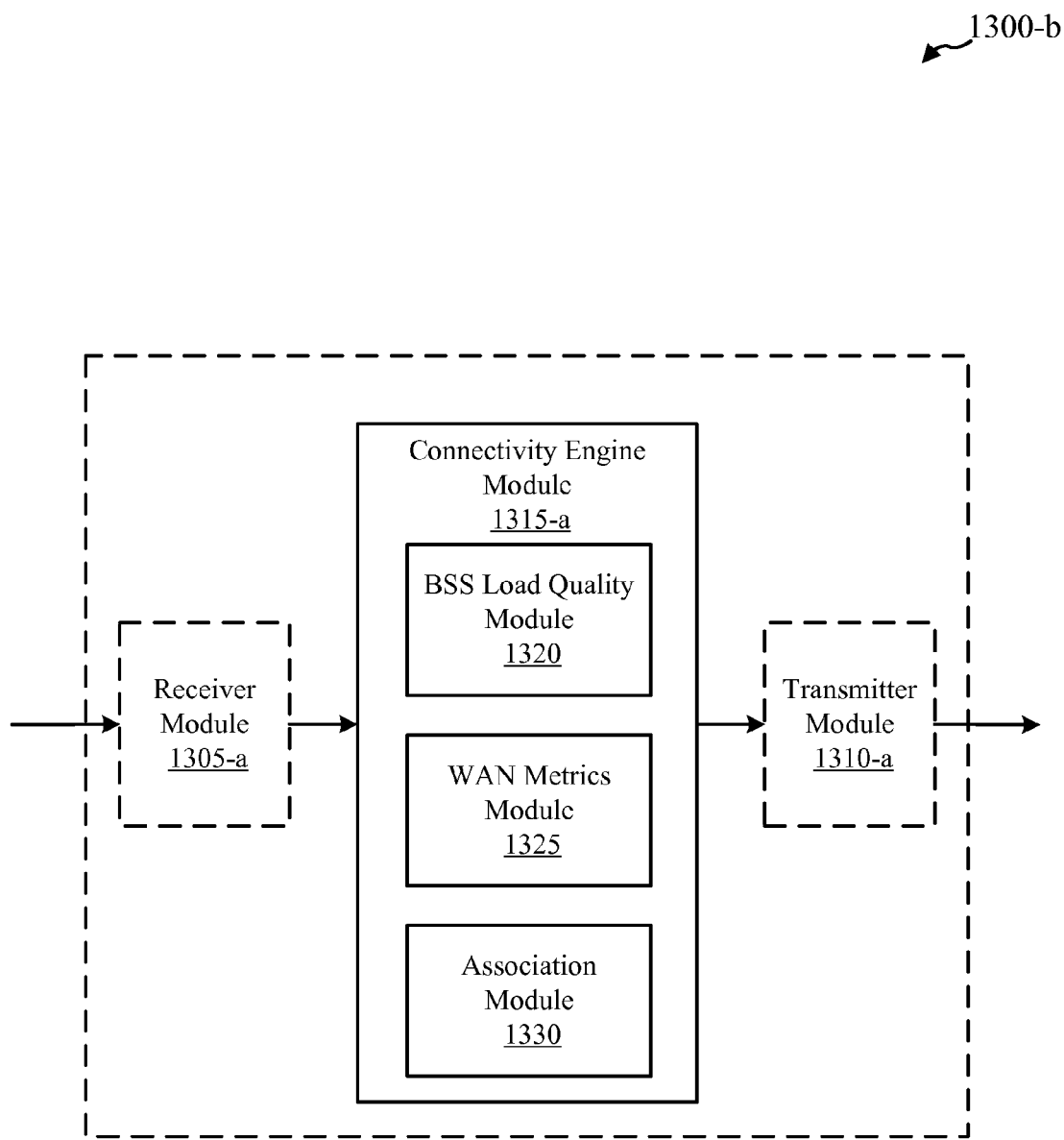
FIG. 13B shows a block diagram of another example of a device configured for determining a quality estimation of a WLAN according to various embodiments.

Referring now to FIG. 13B, a block diagram of a device 1300-b that may be configured for link quality estimation operations according to various embodiments is described. The device 1300-b may be an example of one or more aspects of the devices 115 described with reference to FIGS. 1 and/or 13A. The device 1300-b may include a receiver module 1305-a, a connectivity engine (CnE) module 1315-a, and/or a transmitter module 1310-a, each of which, in embodiments, may be communicably coupled with any or all of the other modules. The device 1300-b may also be a processor.

The components of the device 1300-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1305-a may be an example of the receiver module 1305 of FIG. 13A. The receiver module 1305-a may include any number of receivers, and in some cases may include one or more cellular receivers and/or a wireless local area network (WLAN) receiver. Example cellular receivers include an LTE/LTE-A, CDMA, and/or GSM receiver. The receiver module 1305-a may be used to receive various types of data and/or control signals over a wireless communications system such as the wireless network 100 shown in FIG. 1. As such, the receiver module 1305-a, either alone or in combination with other modules, may be means for communicating as described herein.

In some embodiments, the transmitter module 1310-a may be an example of the transmitter module 1310 of FIG. 13A. The transmitter module 1310-a may include any number of transmitters, and in some cases may include one or more cellular transmitters and/or a WLAN transmitter. Example cellular transmitters include an LTE/LTE-A and/or GSM transmitter. The transmitter module 1310-a may be used to transmit various types of data and/or control signals over a wireless communications system such as the wireless network 100. As such, the transmitter module 1310-a, either alone or in combination with other modules, also may be means for communicating as described herein.

The connectivity engine module 1315-a may perform various functions, including the management of the various methods and checks as described above with respect to FIGS. 1 through 12. As a result, the connectivity engine module 1315-a and related modules, either alone or in combination with other related modules, may be means for performing such functions as described herein.

According to the example of FIG. 13B, connectivity engine module 1315-a may include BSS load quality module 1320, WAN metrics module 1325, and association module 1330. BSS load quality module 1320 may perform various functions, including the management of the various initial and/or periodic methods and checks related to BSS load quality as described above with respect to FIGS. 1 through 12. As such, the BSS load quality module 1320 and related modules, either alone or in combination with other related modules, may be means for performing such functions as described herein. The WAN metrics module 1325 may perform various functions, including the management of the various initial and/or periodic methods and checks related to WAN metrics as described above with respect to FIGS. 1 through 12. As a result, the WAN metrics module 1325 and related modules, either alone or in combination with other related modules, may be means for performing such functions as described herein. The association module 1330 may perform various functions, including the association and storage of identifications (e.g., SSIDs) for associated WLAN APs, as well as blacklists for various APs, as described above with respect to FIGS. 1 through 12. As a result, the association module 1330 and related modules, either alone or in combination with other related modules, may be means for performing such functions as described herein.

Figure 14:
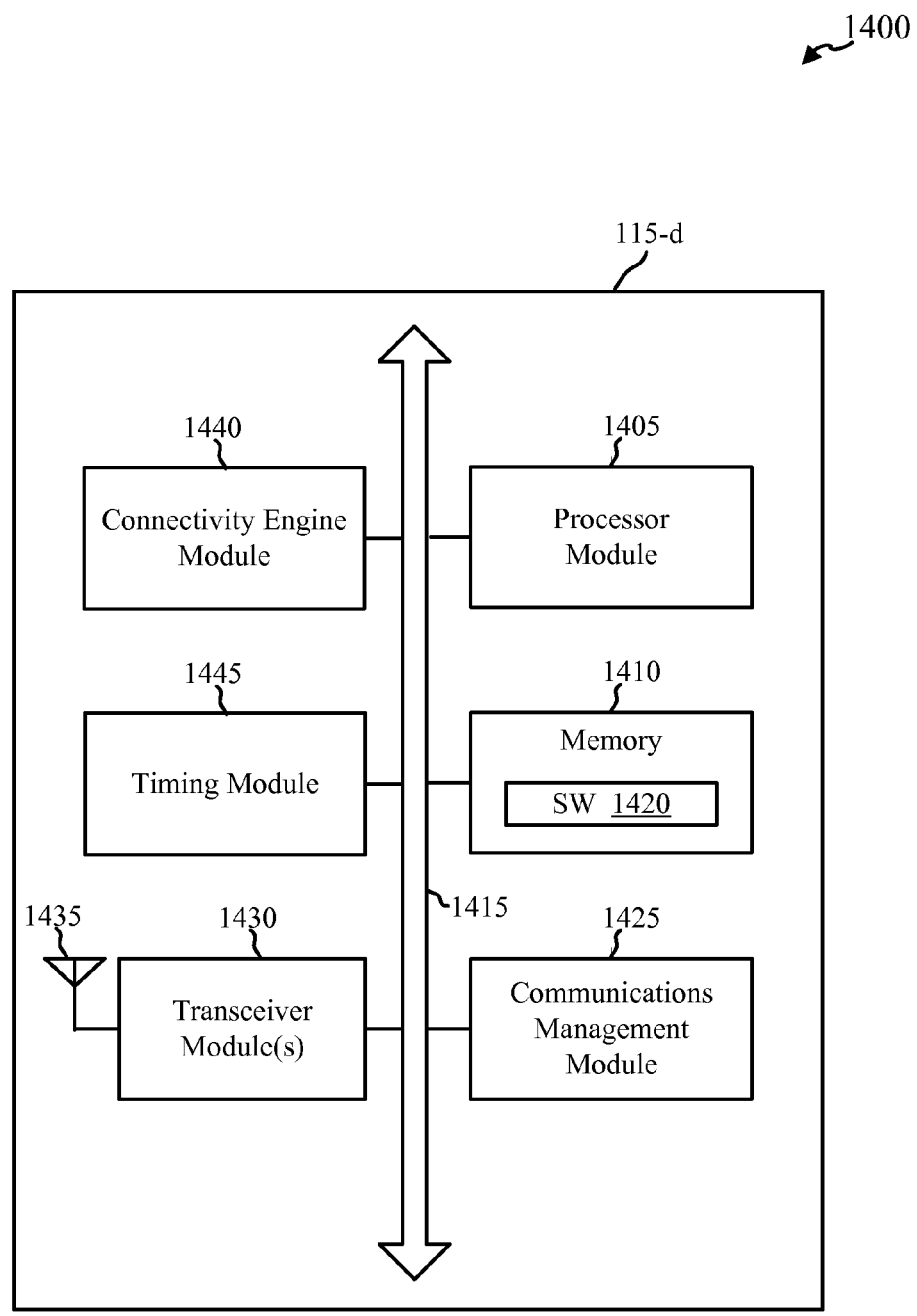
FIG. 14 shows a block diagram of an example of a station according to various embodiments.

FIG. 14 shows a block diagram illustrating an example 1400 of hardware that may be used to implement a device 115-d for performing link quality estimation operations according to various embodiments. The device 115-d may be an example of one or more aspects of the devices 115 described with reference to FIG. 1, the device 1300-a described with reference to FIG. 13A, and/or the device 1300-b described with reference to FIG. 13B. The device 115-d may have any of various configurations, such as personal computers (e.g., laptop computers, netbook computers, tablet computers, etc.), cellular telephones, PDAs, digital video recorders (DVRs), internet appliances, gaming consoles, e-readers, etc. The device 115-d may have an internal power supply (not shown), such as a small battery, to facilitate mobile operation.

The device 115-d may include a processor module 1405, memory 1410, a communications management module 1425, transceiver module(s) 1430, and antenna(s) 1435, which each may be in communication, directly or indirectly, with each other, e.g., via a bus 1415. The transceiver module(s) 1430 may be configured to communicate bi-directionally, via the antennas 1435 and/or one or more wired or wireless links, with one or more networks, as described above. For example, the transceiver module(s) 1430 may be configured to communicate bi-directionally with one or more access points 105 described with reference to FIG. 1. The transceiver module(s) 1430 may also be configured to communicate with one or more other devices 115. The transceiver module(s) 1430 may include a modem configured to modulate packets and provide the modulated packets to the antenna(s) 1435 for transmission, and to demodulate packets received from the antennas(s) 1435. While the device 115-d may include a single antenna, the device 115-d will typically include multiple antennas 1435 for multiple links.

The memory 1410 may include random access memory (RAM) and/or read-only memory (ROM). The memory 1410 may store computer-readable, computer-executable software code 1420 containing instructions that are configured to, when executed, cause the processor module 1405 to perform various functions (e.g., link quality estimates, etc.) described herein. Alternatively, the software code 1420 may not be directly executable by the processor module 1405, but may be configured to cause the device 115-*d* (e.g., when compiled and executed) to perform various of the functions described herein.

The processor module 1405 may include an intelligent hardware device, e.g., a central processing unit (CPU), a microcontroller, an ASIC, etc. The processor module 1405 may include a speech encoder (not shown) configured to receive audio via a microphone, convert the audio into packets (e.g., 30 ms in length) representative of the received audio, provide the audio packets to the transceiver module(s) 1430, and provide indications of whether a user is speaking. Alternatively, an encoder may only provide packets to the transceiver module(s) 1430, with the provision or withholding/suppression of the packet itself providing the indication of whether a user is speaking.

According to the architecture of FIG. 14, the device 115-*d* may further include a communications management module 1425, a connectivity engine module 1440, and/or a timing module 1445. By way of example, the components 1425, 1440, and/or 1445 may be in communication with some or all of the other components of the device 115-*d* via the bus 1415. Alternatively, functionality of the components 1425, 1440, and/or 1445 may be implemented as a component of the transceiver module(s) 1430, as a computer program product, and/or as one or more controller elements of the processor module 1405.

The communications management module 1425 may be configured to manage or otherwise control various communication operations of the device 115-*d*. In particular, the communications management module 1425 may support operations to communicate with a selected WLAN or WWAN for various communications activities. The connectivity engine module 1440 may be configured to perform various functions, including the management of the various initial and/or periodic methods and checks related to WAN metrics as described above with respect to FIGS. 1 through 12. The timing module 1445 may be configured to implement any one or more timers, such as described above with respect to the management of the various initial and/or periodic methods and checks related to WAN metrics as described above with respect to FIGS. 1 through 12.

The components of the device 115-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 115-*d*.

Figure 15:
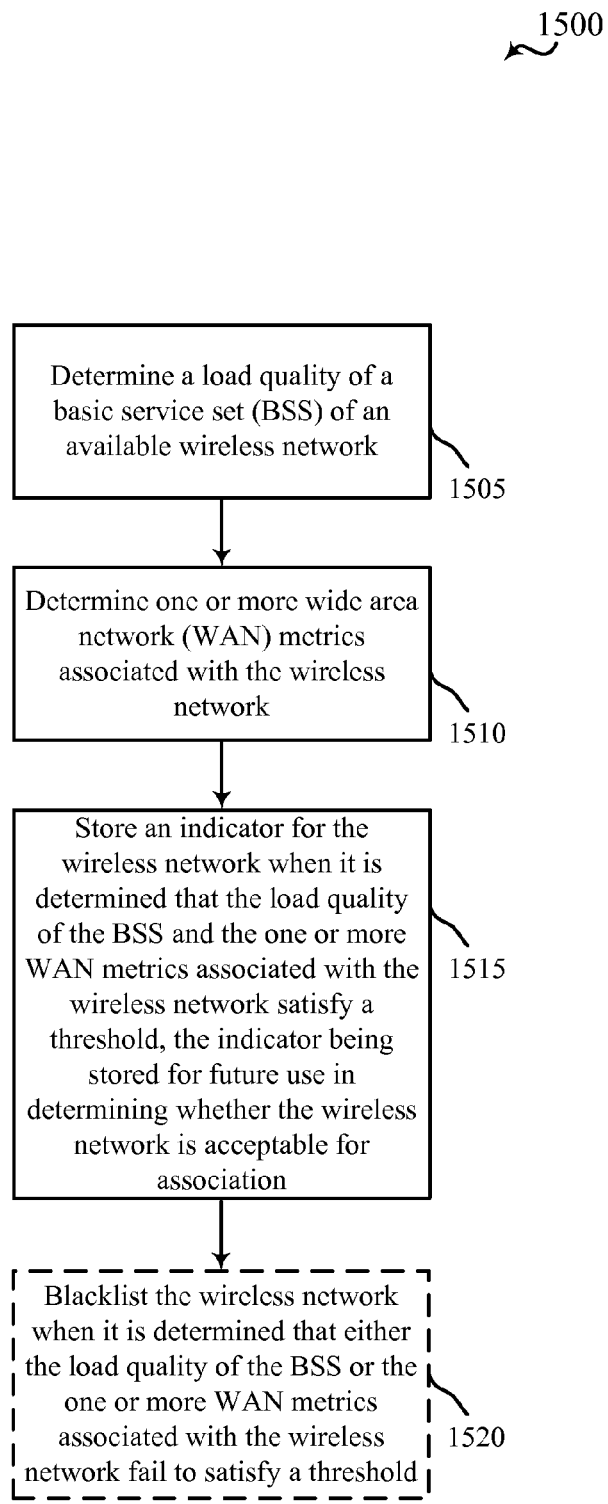
FIG. 15 is a flowchart of a method for determining a quality estimation of a WLAN according to various embodiments.

FIG. 15 is a flowchart illustrating an embodiment 1500 of a method for determining a quality estimation of a wireless network according to various embodiments. For clarity, the method 1500 is described below with reference to ones of the STAs or devices 115 and/or 1300 described with reference to FIGS. 1, 13A, 13B, and/or 14. In one embodiment, a station or device may execute one or more sets of codes to control the functional elements of the station or device to perform the functions described below.

At block 1505, a load quality of a basic service set (BSS) of an available wireless network is determined. Then, at block 1510, one or more wide area network (WAN) metrics associated with the wireless network may be determined. Next, at block 1515, an indicator is stored for the wireless network when it is determined that the load quality of the BSS and the one or more WAN metrics associated with the wireless network satisfy a threshold, the indicator being stored for future use in determining whether the wireless network is acceptable for association. At optional block 1520, the wireless network may be blacklisted when it is determined that either the load quality of the BSS, the one or more WAN metrics, or a combination thereof associated with the WLAN fail to satisfy a threshold. It should be noted that the method 1500 is just one implementation and that the operations of the method 1500 may be rearranged or otherwise modified such that other implementations are possible.

Figure 16:
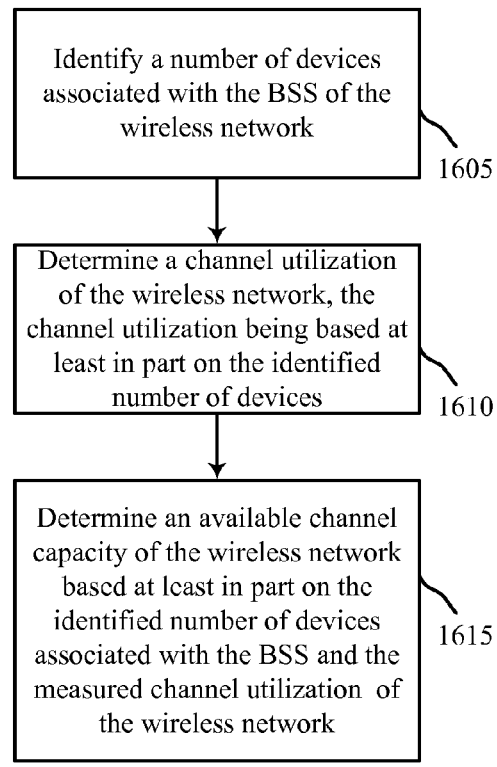
FIG. 16 is a flowchart of another method for determining a quality estimation of a WLAN according to various embodiments.

FIG. 16 is a flowchart illustrating an embodiment 1600 of a method for determining a quality estimation of a wireless network according to various embodiments. For clarity, the method 1600 is described below with reference to ones of the STAs or devices 115 and/or 1300 described with reference to FIGS. 1, 13A, 13B, and/or 14. In one embodiment, a station or device may execute one or more sets of codes to control the functional elements of the station or device to perform the functions described below.

At block 1605, a number of devices associated with the BSS of the wireless network are identified. Then, at block 1610, a channel utilization of the wireless network, based at least in part on the identified number of devices, may be determined. Next, at block 1615, an available channel capacity of the wireless network may be determined based at least in part on the identified number of devices associated with the BSS and the measured channel utilization of the wireless network. It should be noted that the method 1600 is just one implementation and that the operations of the method 1600 may be rearranged or otherwise modified such that other implementations are possible.

Figure 17:
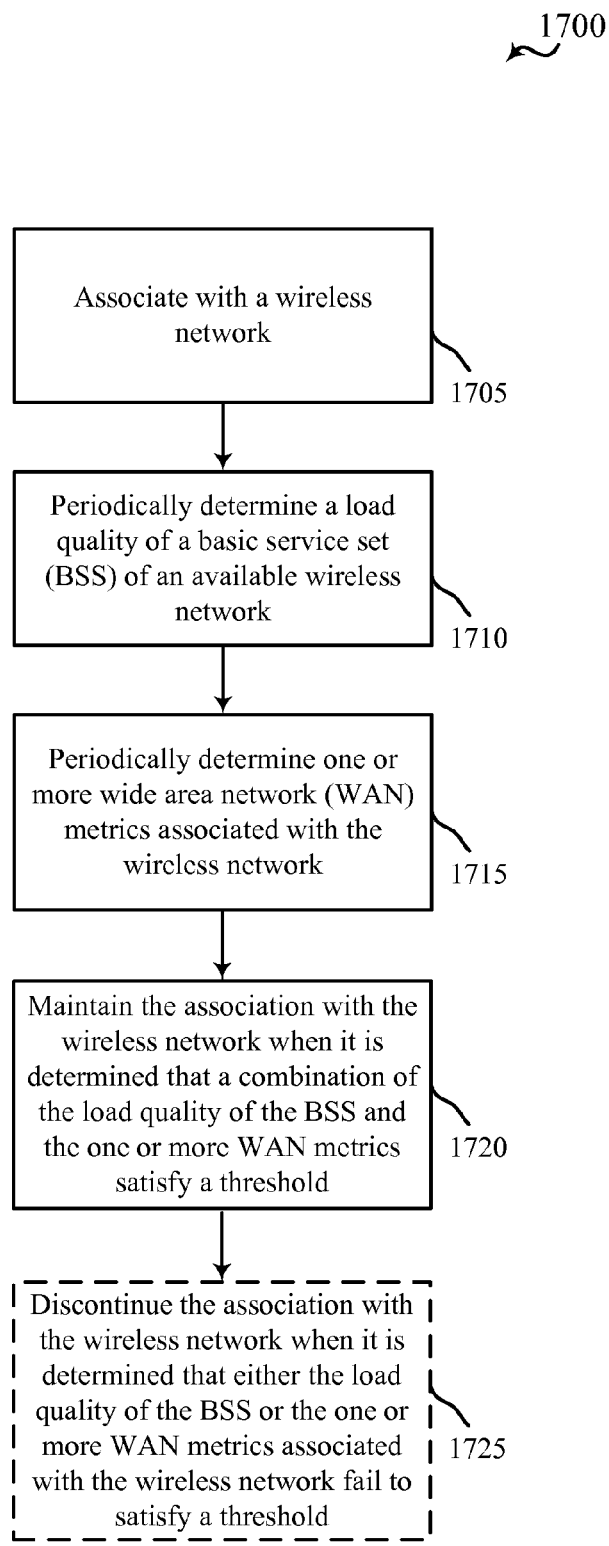
FIG. 17 is a flowchart of another method for determining a quality estimation of a WLAN according to various embodiments.

FIG. 17 is a flowchart illustrating an embodiment 1700 of a method for determining a quality estimation of a wireless network according to various embodiments. For clarity, the method 1700 is described below with reference to ones of the STAs or devices 115 and/or 1300 described with reference to FIGS. 1, 13A, 13B, and/or 14. In one embodiment, a station or device may execute one or more sets of codes to control the functional elements of the station or device to perform the functions described below.

At block 1705, an association with a wireless network is performed. Then, at block 1710, a determination is periodically performed of a load quality of a basic service set (BSS) of an available wireless network. Next, at block 1715, a determination is periodically performed of one or more wide area network (WAN) metrics associated with the wireless network. At block 1720, the association with the wireless network is maintained when it is determined that a combination of the load quality of the BSS and the one or more WAN metrics satisfy a threshold. At optional block 1725, the association with the wireless network is discontinued when it is determined that either the load quality of the BSS or the one or more WAN metrics associated with the wireless network fail to satisfy a threshold. It should be noted that the method 1700 is just one implementation and that the operations of the method 1700 may be rearranged or otherwise modified such that other implementations are possible.

Figure 18:
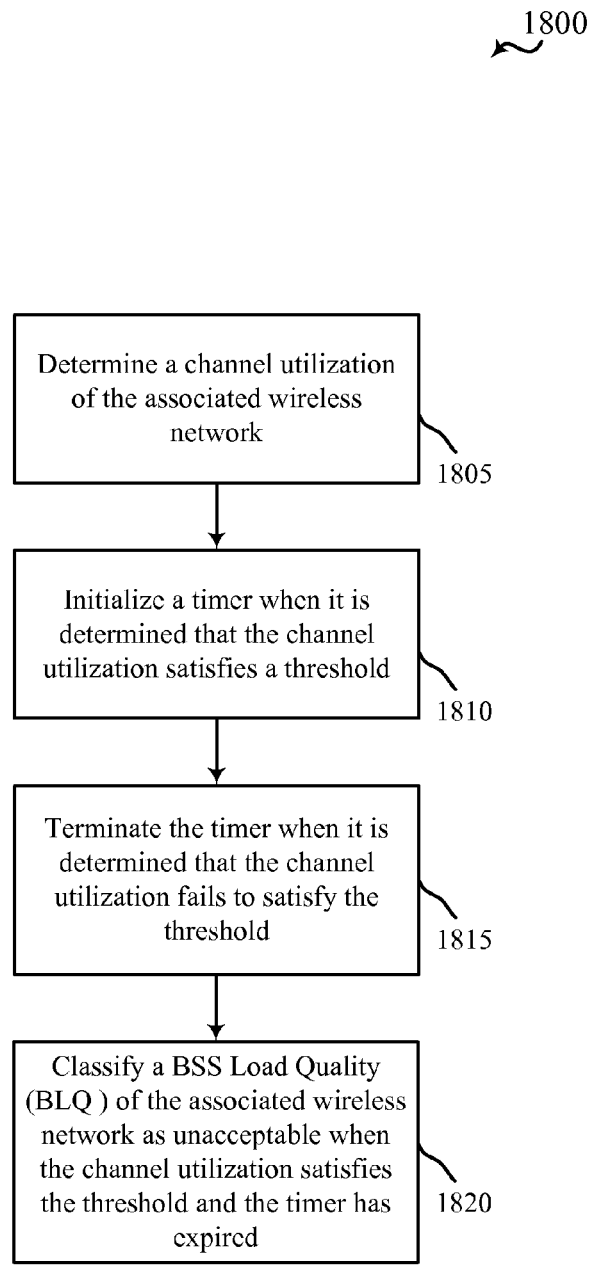
FIG. 18 is a flowchart of another method for determining a quality estimation of a WLAN according to various embodiments.

FIG. 18 is a flowchart illustrating an embodiment 1800 of a method for determining a quality estimation of a wireless network according to various embodiments. For clarity, the method 1800 is described below with reference to ones of the STAs or devices 115 and/or 1300 described with reference to FIGS. 1, 13A, 13B, and/or 14. In one embodiment, a station or device may execute one or more sets of codes to control the functional elements of the station or device to perform the functions described below.

At block 1805, a channel utilization of an associated wireless network is determined. Then, at block 1810, a timer is initialized when it is determined that the channel utilization satisfies a threshold. Next, at block 1815, the timer is terminated when it is determined that the channel utilization fails to satisfy the threshold. At block 1820, a BSS Load Quality (BLQ) of the associated wireless network is classified as unacceptable when the channel utilization satisfies the threshold and the timer has expired. It should be noted that the method 1800 is just one implementation and that the operations of the method 1800 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description, however, describes an LTE system for purposes of example, and LTE terminology is used in much of the description, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for determining a quality estimation of a wireless network, comprising:
   performing an initial link status check (LSC) to determine a link status for an available wireless network;
   determining a trust value indicating whether the wireless network is trusted;
   classifying the wireless network as acceptable if the link status is up and the trust value indicates the wireless network is trusted;
   determining a load quality of a basic service set (BSS) of the wireless network;
   determining one or more wide area network (WAN) metrics associated with the wireless network;
   blacklisting the wireless network if it is determined that either the load quality of the BSS or the one or more WAN metrics associated with the wireless network fail to satisfy a threshold; and
   storing an indicator for the wireless network if it is determined that one or more of the load quality of the BSS or the one or more WAN metrics associated with the wireless network satisfy the threshold, the indicator being stored for future use in determining whether the wireless network is acceptable for association.

2. The method of claim 1, wherein storing the indicator for the wireless network comprises:
   determining that a combination of the load quality of the BSS and the one or more WAN metrics satisfy the threshold; and
   storing the indicator for the wireless network if it is determined that the combination satisfies the threshold.

3. The method of claim 1, wherein determining the load quality of the BSS comprises:
   identifying a number of devices associated with the BSS of the wireless network;
   determining a channel utilization of the wireless network, the channel utilization based at least in part on the identified number of devices; and
   determining an available channel capacity of the wireless network, the available channel capacity based at least in part on a combination of the identified number of devices associated with the BSS and the determined channel utilization of the wireless network.

4. The method of claim 3, wherein identifying the number of devices associated with the BSS of the wireless network comprises:
   receiving one or more beacon frames comprising a number of devices currently associated with the BSS.

5. The method of claim 4, wherein the number of devices currently associated with the BSS is represented in the one or more beacon frames as a ratio of a number of active devices to a total number of devices associated with the BSS.

6. The method of claim 1, wherein performing the initial LSC comprises:
   blacklisting the wireless network if the link status is determined to be down and the trust value indicates the wireless network is not trusted.

7. The method of claim 1, further comprising:
   disabling a periodic LSC if the trust value associated with the determined link status fails to satisfy a second threshold.

8. The method of claim 1, further comprising:
   performing an initial backhaul capacity check (BCC) for the wireless network.

9. The method of claim 8, wherein performing the initial BCC comprises:
   disabling a periodic BCC if a trust value associated with a determined link speed of the wireless network fails to satisfy a third threshold or a trust value associated with a determined link load of the wireless network fails to satisfy a fourth threshold.

10. The method of claim 8, wherein performing the initial BCC comprises:
    classifying the wireless network as acceptable if a combination of a link speed and a link load of the wireless network satisfies a BCC threshold.

11. An apparatus for determining a quality estimation of a wireless network, comprising:
    means for performing an initial link status check (LSC) to determine a link status for an available wireless network;
    means for determining a trust value indicating whether the wireless network is trusted;
    means for classifying the wireless network as acceptable if the link status is up and the trust value indicates the wireless network is trusted;
    means for determining a load quality of a basic service set (BSS) of the wireless network;
    means for determining one or more wide area network (WAN) metrics associated with the wireless network;
    means for blacklisting the wireless network if it is determined that either the load quality of the BSS or the one or more WAN metrics associated with the wireless network fail to satisfy a threshold; and
    means for storing an indicator for the wireless network if it is determined that one or more of the load quality of the BSS or the one or more WAN metrics associated with the wireless network satisfy the threshold, the indicator being stored for future use in determining whether the wireless network is acceptable for association.

12. The apparatus of claim 11, wherein the load quality of the BSS and the one or more WAN metrics are determined prior to association with the wireless network.

13. The apparatus of claim 11, wherein the means for storing the indicator for the wireless network determines that a combination of the load quality of the BSS and the one or more WAN metrics satisfy the threshold, and stores the indicator for the wireless network if it is determined that the combination satisfies the threshold.

14. A device for determining a quality estimation of a wireless network, comprising:
    a processor; and
    a memory in electronic communication with the processor, the memory embodying instructions executable by the processor to:
    perform an initial link status check (LSC) to determine a link status for an available wireless network;
    determine a trust value indicating whether the wireless network is trusted;

classify the wireless network as acceptable if the link status is up and the trust value indicates the wireless network is trusted;

determine a load quality of a basic service set (BSS) of the wireless network;

determine one or more wide area network (WAN) metrics associated with the wireless network;

blacklist the wireless network if it is determined that either the load quality of the BSS or the one or more WAN metrics associated with the wireless network fail to satisfy a threshold; and store an indicator for the wireless network if it is determined that one or more of the load quality of the BSS or the one or more WAN metrics associated with the wireless network satisfy the threshold, the indicator being stored for future use in determining whether the wireless network is acceptable for association.

15. The device of claim 14, wherein the load quality of the BSS and the one or more WAN metrics are determined prior to association with the wireless network.

16. The device of claim 14, wherein the instructions are further executable by the processor to determine that a combination of the load quality of the BSS and the one or more WAN metrics satisfy the threshold, and store the indicator for the wireless network if it is determined that the combination satisfies the threshold.

17. A method for determining a quality estimation of a wireless network, comprising:

performing an initial link status check (LSC) to determine a link status for an available wireless network;

determining a trust value indicating that the wireless network is trusted;

classifying the wireless network as acceptable if the link status is up and the trust value indicates the wireless network is trusted;

associating with the wireless network;

periodically determining a load quality of a basic service set (BSS) of the wireless network;

periodically determining one or more wide area network (WAN) metrics associated with the wireless network;

blacklisting the wireless network if it is determined that either the load quality of the BSS or the one or more WAN metrics associated with the wireless network fail to satisfy a threshold; and maintaining the association with the wireless network if it is determined that a combination of the load quality of the BSS and the one or more WAN metrics satisfy the threshold.

18. The method of claim 17, further comprising:

discontinuing use of the wireless network if it is determined that the combination of the load quality of the BSS and the one or more WAN metrics associated with the wireless network fail to satisfy the threshold.

19. The method of claim 17, further comprising:

accessing a previously stored indicator of the wireless network, the indicator indicating the wireless network is an acceptable wireless network.

20. The method of claim 17, further comprising:

determining a channel utilization of the associated wireless network.

21. The method of claim 20, further comprising:

initializing a timer if it is determined that the channel utilization satisfies a channel utilization threshold; and terminating the timer if it is determined that the channel utilization fails to satisfy the channel utilization threshold.

22. The method of claim 21, further comprising:

classifying a BSS load quality (BLQ) of the associated wireless network as unacceptable if the channel utilization satisfies the channel utilization threshold and the timer has expired.

23. The method of claim 17, further comprising:

performing a periodic LSC for the associated wireless network.

24. The method of claim 23, wherein performing the periodic LSC comprises:

blacklisting the associated wireless network if the link status of the wireless network is determined to be down.

25. The method of claim 17, further comprising:

performing a periodic backhaul capacity check (BCC) for the associated wireless network.

26. The method of claim 25, wherein performing the periodic BCC comprises:

classifying the wireless network as acceptable if a combination of a link speed and a link load of the wireless network satisfies a BCC threshold.

* * * * *